United States Patent
Ohtake et al.

(10) Patent No.: US 10,311,995 B2
(45) Date of Patent: Jun. 4, 2019

(54) THERMOPLASTIC POLYURETHANE RESIN COMPOSITION, CONDUCTOR COVERING MATERIAL, AND MANUFACTURING METHOD OF THESE

(71) Applicants: Kaneka Corporation, Osaka (JP); Showa Kasei Kogyo Co., Ltd., Saitama (JP)

(72) Inventors: Aki Ohtake, Saitama (JP); Hideyuki Hatsuno, Saitama (JP); Kazuya Takahashi, Saitama (JP); Atsunari Kawai, Saitama (JP); Yoshiaki Matsuoka, Hyogo (JP)

(73) Assignees: KANEKA CORPORATION, Osaka (JP); Showa Kasei Kogyo Co., Ltd., Saitama (JP)

(*) Notice: Subject to any disclaimer, the term of this patent is extended or adjusted under 35 U.S.C. 154(b) by 138 days.

(21) Appl. No.: 15/302,795

(22) PCT Filed: Apr. 7, 2015

(86) PCT No.: PCT/JP2015/060890
§ 371 (c)(1),
(2) Date: Oct. 7, 2016

(87) PCT Pub. No.: WO2015/156295
PCT Pub. Date: Oct. 15, 2015

(65) Prior Publication Data
US 2017/0032866 A1  Feb. 2, 2017

(30) Foreign Application Priority Data

Apr. 7, 2014 (JP) ................................ 2014-079020
Apr. 7, 2014 (JP) ................................ 2014-079021

(51) Int. Cl.
| C08L 75/06 | (2006.01) |
| H01B 3/30 | (2006.01) |
| H01B 3/44 | (2006.01) |
| H01B 7/02 | (2006.01) |
| H01B 17/62 | (2006.01) |

(52) U.S. Cl.
CPC .............. *H01B 3/302* (2013.01); *C08L 75/06* (2013.01); *H01B 3/447* (2013.01); *H01B 7/02* (2013.01); *H01B 17/62* (2013.01); *C08L 2201/02* (2013.01); *C08L 2203/202* (2013.01); *C08L 2207/04* (2013.01); *C08L 2207/53* (2013.01)

(58) Field of Classification Search
CPC ................. C08L 75/06; H01B 3/302
See application file for complete search history.

(56) References Cited

U.S. PATENT DOCUMENTS

| 5,731,380 A | 3/1998 | Golder |
| 5,785,916 A | 7/1998 | Huarng |
| 2003/0087084 A1 | 5/2003 | Mori et al. |
| 2007/0155857 A1 | 7/2007 | Lee et al. |
| 2009/0105399 A1 | 4/2009 | Schultes et al. |
| 2009/0215934 A1* | 8/2009 | Nakamura ............... C08K 9/08 524/115 |
| 2011/0130490 A1 | 6/2011 | Brown et al. |
| 2011/0130491 A1 | 6/2011 | Fukushima et al. |
| 2011/0174518 A1* | 7/2011 | Iwasaki ................. H01B 3/302 174/116 |

FOREIGN PATENT DOCUMENTS

| EP | 459257 A2 | 12/1991 |
| JP | H04-227956 A | 8/1992 |
| JP | H06-192566 A | 7/1994 |
| JP | H10-310696 A | 11/1998 |
| JP | 2003-166181 A | 6/2003 |
| JP | 2003-238796 A | 8/2003 |
| JP | 2005-015942 A | 1/2005 |
| JP | 2009-062494 A | 3/2009 |
| JP | 2009-516766 A | 4/2009 |
| JP | 2010-037393 A | 2/2010 |
| JP | 2011-150896 A | 8/2011 |
| WO | 2010/047469 A1 | 4/2010 |
| WO | 2014/196607 A1 | 12/2014 |

OTHER PUBLICATIONS

Extended European Search Report dated Nov. 7, 2017, issued in corresponding European Patent Application No. 15776540.5 (5 pages).
International Search Report issued in PCT/JP2015/060890 dated Jul. 14, 2015 (2 pages).
Written Opinion of the International Searching Authority issued in PCT/JP2015/060890 dated Jul. 14, 2015 (3 pages).

* cited by examiner

*Primary Examiner* — Hannah J Pak
(74) *Attorney, Agent, or Firm* — Osha Liang LLP

(57) ABSTRACT

Provided are a thermoplastic polyurethane resin composition that achieves excellent flame retardancy, a conductor covering material having excellent characteristics, and manufacturing methods therefor. A thermoplastic polyurethane resin composition and a conductor covering material (20) according to embodiments of the present invention each include: 100 parts by weight of a resin component formed of 58.1 parts by weight or more and 73.9 parts by weight or less of a thermoplastic polyurethane resin, and 26.1 parts by weight or more and 41.9 parts by weight or less of core-shell polymer particles; and 42 parts by weight or more and 87 parts by weight or less of a phosphoric acid ester-based flame retardant.

8 Claims, 13 Drawing Sheets

FIG. 5A

| EXAMPLE | | 1A-1 | 1A-2 | 1A-3 | 1A-4 | 1A-5 | 1A-6 | 1A-7 | 1A-8 | 1A-9 | 1A-10 | 1A-11 | 1A-12 | 1A-13 | 1A-14 | 1A-15 | 1A-16 | 1A-17 | 1A-18 | 1A-19 |
|---|---|---|---|---|---|---|---|---|---|---|---|---|---|---|---|---|---|---|---|---|
| FORMULATION (PART(S) BY WEIGHT) | TPU | 90.0 | 75.0 | 74.5 | 74.0 | 73.5 | 73.0 | 70.0 | 66.0 | 65.0 | 64.0 | 62.0 | 60.0 | 59.5 | 59.0 | 58.5 | 58.0 | 55.0 | 50.0 | 35.0 |
| | CS | 10.0 | 25.0 | 25.5 | 26.0 | 26.5 | 27.0 | 30.0 | 34.0 | 35.0 | 36.0 | 38.0 | 40.0 | 40.5 | 41.0 | 41.5 | 42.0 | 45.0 | 50.0 | 65.0 |
| | PE | 45 | 45 | 45 | 45 | 45 | 45 | 45 | 45 | 45 | 45 | 45 | 45 | 45 | 45 | 45 | 45 | 45 | 45 | 45 |
| FLAME-OUT TIME (SEC) | FIRST | DR | 54 | 72 | 11 | 0 | 0 | 1 | 1 | 2 | 1 | 5 | 0 | 6 | 5 | - | BO | BO | BO | BO |
| | SECOND | - | BO | BO | BO | 60 | 60 | 45 | 44 | 65 | 52 | 56 | 59 | 80 | 94 | 99 | - | - | - | - |
| FLAME-RETARDANCY TEST RANK | FIRST | E | C | D | A | A | A | A | A | A | A | A | A | A | A | A | E | E | E | E |
| | SECOND | - | E | E | E | C | C | C | C | C | C | C | C | C | D | D | - | - | - | - |

FIG.5B

| EXAMPLE | | 1B-1 | 1B-2 | 1B-3 | 1B-4 | 1B-5 | 1B-6 | 1B-7 | 1B-8 | 1B-9 | 1B-10 | 1B-11 | 1B-12 | 1B-13 | 1B-14 | 1B-15 | 1B-16 | 1B-17 | 1B-18 | 1B-19 |
|---|---|---|---|---|---|---|---|---|---|---|---|---|---|---|---|---|---|---|---|---|
| PARTS BY WEIGHT OF CS WITH RESPECT TO 100 PARTS BY WEIGHT OF TOTAL OF TPU AND PE | | 7.4 | 20.8 | 21.3 | 21.8 | 22.4 | 22.9 | 26.1 | 30.6 | 31.8 | 33.0 | 35.5 | 38.1 | 38.8 | 39.4 | 40.1 | 40.8 | 45.0 | 52.6 | 81.3 |
| FLAME RETAR- DANCY TEST | FLAME-OUT TIME (SEC) FIRST | BR | 54 | 72 | 11 | 0 | 1 | 1 | 1 | 2 | 1 | 5 | 0 | 6 | 6 | 1 | BO | BO | BO | BO |
| | SECOND | - | BO | BO | BO | 60 | 60 | 45 | 44 | 65 | 52 | 36 | 59 | 80 | 94 | 99 | | | | |
| | RANK FIRST | E | C | D | A | A | A | A | A | A | A | A | A | A | A | A | E | E | E | E |
| | SECOND | - | E | E | E | C | C | C | C | C | C | C | C | C | D | D | - | - | - | - |

FIG. 6

| EXAMPLE | | 2-1 | 2-2 | 2-3 | 2-4 | 2-5 | 2-6 | 2-7 | 2-8 | 2-9 | 2-10 | 2-11 | 2-12 | 2-13 | 2-14 | 2-15 | 2-16 | 2-17 |
|---|---|---|---|---|---|---|---|---|---|---|---|---|---|---|---|---|---|---|
| FORMULATION (PART(S) BY WEIGHT) | TPU | 75 | 65 | 65 | 65 | 65 | 65 | 65 | 65 | 65 | 65 | 65 | 65 | 65 | 65 | 65 | 65 | 65 |
| | CS | 25 | 35 | 35 | 35 | 35 | 35 | 35 | 35 | 35 | 35 | 35 | 35 | 35 | 35 | 35 | 35 | 35 |
| | PE | 15 | 15 | 30 | 35 | 40 | 41 | 43 | 45 | 50 | 55 | 60 | 75 | 80 | 83 | 85 | 88 | 90 |
| FLAME-OUT TIME (SEC) | FIRST | 80 | 80 | 80 | 80 | 1 | 1 | 1 | 2 | 0 | 0 | 0 | 0 | 0 | 0 | 1 | — | — |
| | SECOND | — | — | — | — | 80 | 80 | 47 | 65 | 57 | 40 | 25 | 18 | 1 | 8 | 0 | — | — |
| FLAME RETARDANCY TEST | RANK FIRST | E | E | E | E | A | A | A | A | A | A | A | A | A | A | A | — | — |
| | RANK SECOND | — | — | — | — | E | E | C | C | C | B | B | B | A | A | A | — | — |

FIG. 7

| EXAMPLE | | 3-1 | 3-2 | 3-3 | 3-4 | 3-5 | 3-6 | 3-7 | 3-8 | 3-9 | 3-10 | 3-11 | 3-12 | 3-13 | 3-14 |
|---|---|---|---|---|---|---|---|---|---|---|---|---|---|---|---|
| FORMULATION (PART(S) BY WEIGHT) | TPU | 65 | 65 | 65 | 65 | 65 | 65 | 65 | 65 | 65 | 65 | 65 | 65 | 65 | 65 |
| | CS-ACR99.0 | 35 | -- | -- | -- | -- | -- | -- | -- | -- | -- | -- | -- | -- | -- |
| | CS-ACR94.0 | -- | 35 | -- | -- | -- | -- | -- | -- | -- | -- | -- | -- | -- | -- |
| | CS-ACR92.0 | -- | -- | 35 | -- | -- | -- | -- | -- | -- | -- | -- | -- | -- | -- |
| | CS-ACR90.5 | -- | -- | -- | 35 | -- | -- | -- | -- | -- | -- | -- | -- | -- | -- |
| | CS-ACR89.0 | -- | -- | -- | -- | 35 | -- | -- | -- | -- | -- | -- | -- | -- | -- |
| | CS-ACR85.0 | -- | -- | -- | -- | -- | 35 | -- | -- | -- | -- | -- | -- | -- | -- |
| | CS-ACR82.0 | -- | -- | -- | -- | -- | -- | 35 | -- | -- | -- | -- | -- | -- | -- |
| | CS-ACR80.0 | -- | -- | -- | -- | -- | -- | -- | 35 | -- | -- | -- | -- | -- | -- |
| | CS-ACR75.0 | -- | -- | -- | -- | -- | -- | -- | -- | 35 | -- | -- | -- | -- | -- |
| | CS-ACR60.0 | -- | -- | -- | -- | -- | -- | -- | -- | -- | 35 | -- | -- | -- | -- |
| | CS-ACR57.0 | -- | -- | -- | -- | -- | -- | -- | -- | -- | -- | 35 | -- | -- | -- |
| | CS-ACR55.0 | -- | -- | -- | -- | -- | -- | -- | -- | -- | -- | -- | 35 | -- | -- |
| | CS-ACR50.0 | -- | -- | -- | -- | -- | -- | -- | -- | -- | -- | -- | -- | 35 | -- |
| | CS-ACR40.0 | -- | -- | -- | -- | -- | -- | -- | -- | -- | -- | -- | -- | -- | 35 |
| | PE | 45 | 45 | 45 | 45 | 45 | 45 | 45 | 45 | 45 | 45 | 45 | 45 | 45 | 45 |
| FLAME-OUT TIME (SEC) | FIRST | BO | 45 | 39 | 48 | 42 | 58 | 0 | 0 | 0 | 1 | -- | -- | 1 | 0 |
| | SECOND | -- | 67 | 71 | 36 | 32 | 6 | 46 | 42 | 44 | 61 | DR | DR | 95 | DR |
| FLAME RETARDANCY TEST | RANK | E | C | B | C | C | C | A | A | A | A | A | A | A | A |
| | | -- | C | C | B | B | A | C | C | C | C | E | E | D | E |
| SHORE A HARDNESS OF CS PARTICLES | | -- | 40 | 42 | 42 | 55 | 76 | 85 | 87 | 87 | 90 | 94 | 95 | -- | 96 |

FIG. 8

| EXAMPLE | | 4-1 | 4-2 | 4-3 | 4-4 | 4-5 | 4-6 | 4-7 | 4-8 | 4-9 | 4-10 | 4-11 |
|---|---|---|---|---|---|---|---|---|---|---|---|---|
| FORMULATION (PART(S) BY WEIGHT) | TPU | 65 | 65 | 65 | 65 | 65 | 65 | 65 | 65 | 65 | 65 | 65 |
| | CS-SC0.00 | 35 | -- | -- | -- | -- | -- | -- | -- | -- | -- | -- |
| | CS-SC0.25 | -- | 35 | -- | -- | -- | -- | -- | -- | -- | -- | -- |
| | CS-SC0.30 | -- | -- | 35 | -- | -- | -- | -- | -- | -- | -- | -- |
| | CS-SC0.35 | -- | -- | -- | 35 | -- | -- | -- | -- | -- | -- | -- |
| | CS-SC0.40 | -- | -- | -- | -- | 35 | -- | -- | -- | -- | -- | -- |
| | CS-SC0.42 | -- | -- | -- | -- | -- | 35 | -- | -- | -- | -- | -- |
| | CS-SC0.45 | -- | -- | -- | -- | -- | -- | 35 | -- | -- | -- | -- |
| | CS-SC0.50 | -- | -- | -- | -- | -- | -- | -- | 35 | -- | -- | -- |
| | CS-SC1.00 | -- | -- | -- | -- | -- | -- | -- | -- | 35 | -- | -- |
| | CS-SC1.50 | -- | -- | -- | -- | -- | -- | -- | -- | -- | 35 | -- |
| | CS-SC2.00 | -- | -- | -- | -- | -- | -- | -- | -- | -- | -- | 35 |
| | PE | 45 | 45 | 45 | 45 | 45 | 45 | 45 | 45 | 45 | 45 | 45 |
| FLAME RETARDANCY TEST | FLAME-OUT TIME (SEC) FIRST | 42 | 43 | 45 | 45 | 53 | 32 | 0 | 2 | 0 | 8 | 11 |
| | FLAME-OUT TIME (SEC) SECOND | 32 | 15 | 3 | 7 | 6 | 52 | 57 | 65 | 41 | 54 | 78 |
| | RANK FIRST | C | C | C | C | C | C | A | A | A | A | A |
| | RANK SECOND | B | A | A | A | A | C | C | C | C | C | C |
| SHORE A HARDNESS OF CS PARTICLES | | 55 | 62 | -- | -- | -- | -- | -- | 67 | 66 | 66 | 67 |

FIG.9

| EXAMPLE | | 5-1 | 5-2 | 5-3 | 5-4 | 5-5 | 5-6 | 5-7 | 5-8 | 5-9 | 5-10 | 5-11 | 5-12 |
|---|---|---|---|---|---|---|---|---|---|---|---|---|---|
| FORMULATION (PART(S) BY WEIGHT) | TPU | 65 | 65 | 65 | 65 | 65 | 65 | 65 | 65 | 65 | 65 | 65 | 65 |
| | CS-BR78.0 | 35 | - | - | - | - | - | - | - | - | - | - | - |
| | CS-BR72.5 | - | 35 | - | - | - | - | - | - | - | - | - | - |
| | CS-BR67.5 | - | - | 35 | - | - | - | - | - | - | - | - | - |
| | CS-BR63.0 | - | - | - | 35 | - | - | - | - | - | - | - | - |
| | CS-SBR75 | - | - | - | - | 35 | - | - | - | - | - | - | - |
| | CS-SBR72 | - | - | - | - | - | 35 | - | - | - | - | - | - |
| | CS-SBR70 | - | - | - | - | - | - | 35 | - | - | - | - | - |
| | CS-SBR60 | - | - | - | - | - | - | - | 35 | - | - | - | - |
| | CS-SBR50 | - | - | - | - | - | - | - | - | 35 | - | - | - |
| | CS-SBR45 | - | - | - | - | - | - | - | - | - | 35 | - | - |
| | CS-SIR70 | - | - | - | - | - | - | - | - | - | - | 35 | 35 |
| | PE | 45 | 60 | 60 | 60 | 60 | 60 | 60 | 60 | 60 | 60 | 60 | 45 |
| FLAME RETARDANCY TEST | FLAME-OUT TIME (SEC) FIRST | 77 | 22 | 20 | 2 | 1 | 0 | 0 | 1 | 0 | 0 | 3 | 83 |
| | FLAME-OUT TIME (SEC) SECOND | 57 | 47 | 43 | 86 | 92 | 87 | 96 | 86 | 75 | 89 | 100 | 8 |
| | RANK FIRST | D | B | B | A | A | A | A | A | A | A | A | D |
| | RANK SECOND | C | C | C | D | D | D | D | D | C | D | D | A |

FIG.10

| EXAMPLE | | 6-1 | 6-2 | 6-3 | 6-4 |
|---|---|---|---|---|---|
| FORMULATION (PART(S) BY WEIGHT) | TPU | 65 | 65 | 65 | 65 |
| | PMMA | 35 | — | — | — |
| | NBR | — | 35 | — | — |
| | EVA | — | — | 35 | — |
| | EEA | — | — | — | 35 |
| | PE | 45 | 60 | 60 | 45 |
| FLAME RETARDANCY TEST | FLAME-OUT TIME (SEC) FIRST | DR | DR | DR | DR |
| | SECOND | — | — | — | — |
| | RANK FIRST | E | E | E | E |
| | SECOND | — | — | — | — |

FIG.11

| EXAMPLE | | 7-1 | 7-2 | 7-3 | 7-4 | 7-5 | 7-6 | 7-7 |
|---|---|---|---|---|---|---|---|---|
| FORMULATION (PART(S) BY WEIGHT) | TPU | 65 | 65 | 65 | 65 | 65 | 65 | 65 |
| | CS | 35 | — | — | — | — | — | — |
| | PE-I | 45 | — | — | — | — | — | — |
| | PE-II | — | 45 | — | — | — | — | — |
| | PE-III | — | — | 45 | — | — | — | — |
| | PE-IV | — | — | — | 45 | — | — | — |
| | PE-V | — | — | — | — | 45 | — | — |
| | PE-VI | — | — | — | — | — | 45 | — |
| | PE-VII | — | — | — | — | — | — | 45 |
| FLAME RETARDANCY TEST | FLAME-OUT TIME (SEC) FIRST | 2 | 0 | 37 | 0 | 87 | 0 | 0 |
| | SECOND | 65 | 50 | 45 | 24 | 1 | 1 | 17 |
| | RANK FIRST | A | A | B | A | D | A | A |
| | SECOND | C | C | C | B | A | A | B |

FIG.12

| EXAMPLE | | 8-1 | 8-2 | 8-3 | 8-4 | 8-5 | 8-6 | 8-7 |
|---|---|---|---|---|---|---|---|---|
| FORMULATION (PART(S) BY WEIGHT) | TPU-I | 65 | - | - | - | - | - | - |
| | TPU-II | - | 65 | - | - | - | - | - |
| | TPU-III | - | - | 65 | - | - | - | - |
| | TPU-IV | - | - | - | 65 | 65 | - | - |
| | TPU-V | - | - | - | - | - | 65 | 65 |
| | CS | 35 | 35 | 35 | 35 | 35 | 35 | 35 |
| | PE | 45 | 45 | 60 | 45 | 60 | 45 | 60 |
| FLAME RETARDANCY TEST | FLAME-OUT TIME (SEC) FIRST | 2 | 29 | 4 | 50 | 0 | 1 | 1 |
| | SECOND | 65 | 52 | 26 | 5 | 7 | 88 | 65 |
| | RANK FIRST | A | B | A | C | A | A | A |
| | SECOND | C | C | B | A | A | D | C |

FIG. 13

| CORE LAYER (WT%) | DEGREE OF CROSSLINKING OF SHELL LAYER (%) | | | | | | | | | | | | |
|---|---|---|---|---|---|---|---|---|---|---|---|---|---|
| | 0.20 | 0.25 | 0.30 | 0.35 | 0.40 | 0.42 | 0.45 | 0.50 | 1.00 | 1.50 | 2.00 |
| 94.0 | C(45)/C(67) <40> | --- | --- | --- | --- | --- | --- | C(45)/C(45) | --- | --- | --- |
| 92.0 | B(39)/C(71) <42> | --- | --- | --- | --- | --- | --- | C(50)/A(5) | --- | --- | B(38)/B(16) |
| 90.5 | C(48)/B(36) <42> | --- | --- | --- | --- | --- | --- | C(50)/A(6) <60> | --- | --- | C(52)/B(18) <60> |
| 89.5 | --- | --- | --- | --- | --- | --- | B(27)/B(35) <86> | A(0)/C(43) <66> | --- | --- | A(6)/C(64) <67> |
| 89.0 | C(42)/B(32) <55> | C(43)/A(15) <62> | C(45)/A(3) | C(45)/A(7) | C(53)/A(6) | B(32)/C(52) | A(0)/C(57) | A(2)/C(65) <67> | A(0)/C(41) <66> | A(8)/C(54) <66> | A(11)/C(78) <67> |
| 85.0 | C(50)/A(6) <76> | A(0)/B(30) <80> | --- | A(0)/B(30) <82> | --- | A(1)/B(38) <83> | --- | A(0)/C(72) <83> | --- | --- | --- |
| 82.0 | A(0)/C(46) <85> | --- | --- | --- | --- | --- | --- | --- | --- | --- | --- |
| 80.0 | A(0)/C(42) <87> | --- | --- | --- | A(0)/B(39) <93> | --- | --- | --- | --- | --- | --- |
| 75.0 | A(0)/C(44) <87> | --- | --- | --- | --- | --- | --- | A(1)/B(17) <93> | --- | --- | A(0)/C(42) |
| 60.0 | A(1)/C(61) <90> | --- | --- | --- | --- | --- | --- | A(1)/C(53) <93> | --- | --- | --- |
| 57.0 | A(1)/E(DR) <94> | --- | --- | --- | --- | --- | --- | A(1)/B(36) <96> | --- | --- | A(0)/B(37) <96> |
| 55.0 | A(1)/E(DR) <95> | --- | --- | --- | --- | --- | --- | A(0)/B(40) <96> | --- | --- | --- |
| 52.0 | --- | --- | --- | --- | --- | --- | --- | A(0)/E(DR) <96> | --- | --- | --- |
| 50.0 | A(1)/D(95) | --- | --- | --- | --- | --- | --- | A(0)/E(DR) | --- | --- | A(1)/C(41) <96> |
| 40.0 | A(0)/E(DR) <96> | --- | --- | --- | --- | --- | --- | A(0)/E(DR) | --- | --- | A(0)/E(DR) <96> |

FIG. 14

| EXAMPLE | | 10-1 | 10-2 | 10-3 | 10-4 | 10-5 | 10-6 | 10-7 | 10-8 | 10-9 | 10-10 |
|---|---|---|---|---|---|---|---|---|---|---|---|
| FORMULATION (PART(S) BY WEIGHT) | TPU | 80.0 | 74.0 | 73.5 | 70.0 | 65.0 | 60.0 | 58.5 | 58.0 | 50.0 | 65.0 |
| | CS-ACR75.0 | 20.0 | 26.0 | 26.5 | 30.0 | 35.0 | 40.0 | 41.5 | 42.0 | 50.0 | - |
| | SA-1000P | - | - | - | - | - | - | - | - | - | 35.0 |
| | PE | 45 | 45 | 45 | 45 | 45 | 45 | 45 | 45 | 45 | 45 |
| FLAME-OUT TIME (SEC) | FIRST | DR | 22 | 30 | 0 | 0 | 0 | 71 | 74 | 81 | 82 |
| | SECOND | DR | 49 | 39 | 45 | 44 | 60 | 8 | 5 | BO | 4 |
| FLAME RETARDANCY TEST | RANK FIRST | A | B | B | A | A | A | C | C | D | D |
| | RANK SECOND | E | C | B | C | C | C | A | A | E | A |

FIG.15

| EXAMPLE | | | 11-1 | 11-2 | 11-3 | 11-4 | 11-5 | 11-6 | 11-7 |
|---|---|---|---|---|---|---|---|---|---|
| FORMULATION (PART(S) BY WEIGHT) | TPU | | 65 | 65 | 65 | 65 | 65 | 65 | 65 |
| | CS-AGR75.0 | | 35 | 35 | 35 | 35 | 35 | 35 | 35 |
| | PE | | 35 | 40 | 41 | 43 | 45 | 80 | 85 |
| FLAME RETARDANCY TEST | FLAME-OUT TIME (SEC) | FIRST | 80 | 55 | 0 | 0 | 0 | 0 | 0 |
| | | SECOND | — | 80 | 50 | 50 | 45 | 2 | 1 |
| | RANK | FIRST | E | C | A | A | A | A | A |
| | | SECOND | — | E | C | C | C | A | A |

THERMOPLASTIC POLYURETHANE RESIN COMPOSITION, CONDUCTOR COVERING MATERIAL, AND MANUFACTURING METHOD OF THESE

TECHNICAL FIELD

The present invention relates a thermoplastic polyurethane resin composition, a conductor covering material, and manufacturing methods therefor, and more particularly, to an improvement in flame retardancy of a thermoplastic polyurethane resin composition and improvements in characteristics of a conductor covering material.

BACKGROUND ART

In Patent Literature 1, there is a disclosure of a flame-retardant thermoplastic resin composition containing, as main components, a thermoplastic polyurethane elastomer, and an ethylene polymer and/or an ethylene-based copolymer, and further containing two specific kinds of (poly) phosphate compounds and a specific phosphoric acid ester compound.

In Patent Literature 2, there is a disclosure of a flame-retardant synthetic resin leather obtained by arranging a thermoplastic polyurethane resin layer on at least one surface of a base fabric subjected to flame-retardant processing with a nitrogen-phosphorus-based flame retardant. In paragraph 0014 of Patent Literature 2, there is a disclosure that: a thermoplastic polyurethane resin, which may be used alone, is preferably used in combination with an acrylic soft resin; when the thermoplastic polyurethane resin is mixed with a specific soft acrylic resin, the thermoplastic polyurethane resin can be softened without the deterioration of its flame retardancy; and when a thermoplastic polyurethane having a Shore A hardness of from 65 to 90 is mixed with an acrylic soft resin having a Shore A hardness of from 50 to 80, a mixed resin having a Shore A hardness of from 60 to 80 can be obtained without the deterioration of its flame retardancy. In paragraph 0018 thereof, there is a disclosure that the acrylic soft resin is preferably a multilayer structure polymer, i.e., a particulate polymer in which two or more kinds of acrylic polymers form a core-shell type multilayer structure, and in paragraph 0034 thereof, there is a disclosure that SA-1000P manufactured by Kuraray Co., Ltd. (acrylic soft resin, Shore A hardness: 70) is used as the acrylic soft resin in Examples. However, in Patent Literature 2, as described above, the thermoplastic polyurethane resin layer is merely arranged as part of the flame-retardant synthetic resin leather on at least one surface of the base fabric subjected to the flame-retardant processing with the nitrogen-phosphorus-based flame retardant.

In Patent Literature 3, there is a disclosure of a non-halogen flame-retardant cable obtained by arranging an inner layer on the outside of a multicore twisted wire, which is obtained by twisting the outer periphery of a conductor with a plurality of insulated wires each having an insulating layer, and arranging an outer layer on the inner layer, in which: the outer layer is formed of a resin composition containing 30 parts by mass or more of a flame retardant with respect to 100 parts by mass of a thermoplastic polyurethane (TPU); the inner layer is formed of a resin composition formed of an ethylene-vinyl acetate copolymer (EVA) whose acetic acid component (VA) amount is 33% or more; and the outer layer is subjected to a crosslinking treatment.

CITATION LIST

Patent Literature

[Patent Literature 1] JP 2010-037393 A
[Patent Literature 2] JP 2005-015942 A
[Patent Literature 3] JP 2011-150896 A

SUMMARY OF INVENTION

Technical Problem

However, the flame retardancy of a related-art polyurethane resin composition has not been necessarily sufficient. In addition, the characteristics of a related-art conductor covering material have not been necessarily sufficient.

The present invention has been made in view of the problems, and one of the objects of the present invention is to provide a thermoplastic polyurethane resin composition that achieves excellent flame retardancy, a conductor covering material having excellent characteristics, and manufacturing methods therefor.

Solution to Problem

A thermoplastic polyurethane resin composition according to one embodiment of the present invention for solving the above-mentioned problems includes: 100 parts by weight of a resin component formed of 58.1 parts by weight or more and 73.9 parts by weight or less of a thermoplastic polyurethane resin, and 26.1 parts by weight or more and 41.9 parts by weight or less of core-shell polymer particles; and 42 parts by weight or more and 87 parts by weight or less of a phosphoric acid ester-based flame retardant. According to the present invention, the thermoplastic polyurethane resin composition that achieves excellent flame retardancy is provided.

In addition, in the thermoplastic polyurethane resin composition, the core-shell polymer particles may each include one or more core layers and one or more shell layers, the core layers may include an outermost core layer composed of a polymer having a glass transition temperature of less than 40° C., the shell layers may include a crosslinked shell layer composed of a copolymer obtained by polymerization of raw materials including one or more kinds selected from a group consisting of a (meth)acrylic acid ester and a vinyl cyanide compound, and a polyfunctional monomer, the copolymer having a glass transition temperature of 40° C. or more, and the core-shell polymer particles may be one or more kinds selected from a group consisting of the following (a) to (d): (a) core-shell polymer particles each including 50.1 wt % or more and 88.9 wt % or less of the core layers with respect to 100 wt % of a total of the core layers and the shell layers, and having a degree of crosslinking of the crosslinked shell layer of 0.05% or more and 0.42% or less; b) core-shell polymer particles each including 50.1 wt % or more and 89.4 wt % or less of the core layers with respect to 100 wt % of a total of the core layers and the shell layers, and having a degree of crosslinking of the crosslinked shell layer of more than 0.42% and 0.45% or less; c) core-shell polymer particles each including 50.1 wt % or more and 90.4 wt % or less of the core layers with respect to 100 wt % of a total of the core layers and the shell layers, and having a degree of crosslinking of the crosslinked shell layer of more than 0.45% and 0.50% or less; and (d) core-shell polymer particles each including 40.1 wt % or more and 90.4 wt % or less of the core layers with respect to 100 wt % of a total of the core layers and the shell layers, and having a degree of crosslinking of the crosslinked shell layer of more than 0.50% and 5.00% or less. In this case, the core-shell polymer particles may include at least the (a). The core-shell polymer particles may also include at least the (b). The core-shell polymer particles may also include at least the (c). The core-shell polymer particles may also include at least the (d). In addition, in each of these cases, the copolymer composing the crosslinked shell layer may be a copolymer of one or more kinds selected from a group consisting of the (meth) acrylic acid ester and the vinyl cyanide compound, the polyfunctional monomer, and an unsaturated monomer capable of copolymerizing therewith. Further, in each of these cases, the thermoplastic polyurethane resin composition may include: 100 parts by weight of the resin component formed of 59.1 parts by weight or more and 73.9 parts by weight or less of the thermoplastic polyurethane resin, and 26.1 parts by weight or more and 40.9 parts by weight or less of the core-shell polymer particles; and 42 parts by weight or more and 87 parts by weight or less of the phosphoric acid ester-based flame retardant.

In addition, the thermoplastic polyurethane resin composition may contain 100 parts by weight of a resin component formed of 58.1 parts by weight or more and 73.9 parts by weight or less of a thermoplastic polyurethane resin, and 26.1 parts by weight or more and 41.9 parts by weight or less of core-shell polymer particles, and 42 parts by weight or more and 87 parts by weight or less of a phosphoric acid ester-based flame retardant, and each of the core-shell polymer particles may be composed of one or more core layers and one or more shell layers, and may each include 57.1 wt % or more and 82.0 wt % or less of the core layers with respect to 100 wt % of the total of the core layers and the shell layers. In this case, the core-shell polymer particles may have a Shore A hardness of 81 or more and 100 or less, the hardness being measured by a method in conformity with JIS K 6253-3:2012 in which: a type A durometer is used as a testing machine; an automatic timer apparatus is not used; a laminate obtained by laminating 6 sheets (30 mm×40 mm) each having a thickness of 1.0 mm or more and 1.5 mm or less is used as a test piece; the test piece is subjected to conditioning at a temperature of 23° C. and a relative humidity of 50% for 24 hours or more, and then a pressure plate is brought into contact with the test piece at a temperature of 23° C. and a relative humidity of 50%; and a measured value 10 seconds after the contact is read. In addition, in each of these cases, each of the one or more shell layers may be composed of a polymer obtained by polymerization of a raw material including one or more kinds selected from a group consisting of a (meth)acrylic acid ester and a vinyl cyanide compound, the polymer having a glass transition temperature of 40° C. or more. In addition, in this case, the thermoplastic polyurethane resin composition may include: 100 parts by weight of the resin component formed of 58.6 parts by weight or more and 73.4 parts by weight or less of the thermoplastic polyurethane resin, and 26.6 parts by weight or more and 41.4 parts by weight or less of the core-shell polymer particles; and 41 parts by weight or more and 87 parts by weight or less of the phosphoric acid ester-based flame retardant. In addition, in each of these cases, the polymer composing each of the one or more shell layers may be a copolymer of one or more kinds selected from a group consisting of the (meth)acrylic acid ester and the vinyl cyanide compound, and an unsaturated monomer capable of copolymerizing therewith.

In addition, the thermoplastic polyurethane resin composition may be a thermoplastic polyurethane resin composition for a conductor covering material.

A manufacturing method for a thermoplastic polyurethane resin composition according to one embodiment of the present invention for solving the above-mentioned problems includes mixing: 100 parts by weight of a resin component formed of 58.1 parts by weight or more and 73.9 parts by weight or less of a thermoplastic polyurethane resin, and 26.1 parts by weight or more and 41.9 parts by weight or less of core-shell polymer particles; and 42 parts by weight or more and 87 parts by weight or less of a phosphoric acid ester-based flame retardant. According to the present invention, the manufacturing method for a thermoplastic polyurethane resin composition that achieves excellent flame retardancy is provided.

A conductor covering material according to one embodiment of the present invention for solving the above-mentioned problems includes: 100 parts by weight of a resin component formed of 58.1 parts by weight or more and 73.9 parts by weight or less of a thermoplastic polyurethane resin, and 26.1 parts by weight or more and 41.9 parts by weight or less of core-shell polymer particles; and 42 parts by weight or more and 87 parts by weight or less of a phosphoric acid ester-based flame retardant. According to the present invention, the conductor covering material having excellent characteristics is provided.

In addition, in the conductor covering material, the core-shell polymer particles may each include one or more core layers and one or more shell layers, the core layers may include an outermost core layer composed of a polymer having a glass transition temperature of less than 40° C., the shell layers may include a crosslinked shell layer composed of a copolymer obtained by polymerization of raw materials including one or more kinds selected from a group consisting of a (meth)acrylic acid ester and a vinyl cyanide compound, and a polyfunctional monomer, the copolymer having a glass transition temperature of 40° C. or more, and the core-shell polymer particles may be one or more kinds selected from a group consisting of the following (a) to (d): (a) core-shell polymer particles each including 50.1 wt % or more and 88.9 wt % or less of the core layers with respect to 100 wt % of a total of the core layers and the shell layers, and having a degree of crosslinking of the crosslinked shell layer of 0.05% or more and 0.42% or less; (b) core-shell polymer particles each including 50.1 wt % or more and 89.4 wt % or less of the core layers with respect to 100 wt % of a total of the core layers and the shell layers, and having a degree of crosslinking of the crosslinked shell layer of more than 0.42% and 0.45% or less; (c) core-shell polymer particles each including 50.1 wt % or more and 90.4 wt % or less of the core layers with respect to 100 wt % of a total of the core layers and the shell layers, and having a degree of crosslinking of the crosslinked shell layer of more than 0.45% and 0.50% or less; and (d) core-shell polymer particles each including 40.1 wt % or more and 90.4 wt % or less of the core layers with respect to 100 wt % of a total of the core layers and the shell layers, and having a degree of crosslinking of the crosslinked shell layer of more than 0.50% and 5.00% or less. In this case, the core-shell polymer particles may include at least the (a). The core-shell polymer particles may also include at least the (b). The core-shell polymer particles may also include at least the (c). The core-shell polymer particles may include at least the (d). In addition, in each of these cases, the copolymer composing the crosslinked shell layer may be a copolymer of one or more kinds selected from a group consisting of the (meth)

acrylic acid ester and the vinyl cyanide compound, the polyfunctional monomer, and an unsaturated monomer capable of copolymerizing therewith. Further, in each of these cases, the conductor covering material may include: 100 parts by weight of the resin component formed of 59.1 parts by weight or more and 73.9 parts by weight or less of the thermoplastic polyurethane resin, and 26.1 parts by weight or more and 40.9 parts by weight or less of the core-shell polymer particles; and 42 parts by weight or more and 87 parts by weight or less of the phosphoric acid ester-based flame retardant.

In addition, the conductor covering material may contain 100 parts by weight of a resin component formed of 58.1 parts by weight or more and 73.9 parts by weight or less of a thermoplastic polyurethane resin, and 26.1 parts by weight or more and 41.9 parts by weight or less of core-shell polymer particles, and 42 parts by weight or more and 87 parts by weight or less of a phosphoric acid ester-based flame retardant, and each of the core-shell polymer particles may be composed of one or more core layers and one or more shell layers, and may each include 57.1 wt % or more and 82.0 wt % or less of the core layers with respect to 100 wt % of the total of the core layers and the shell layers. In this case, the core-shell polymer particles may have a Shore A hardness of 81 or more and 100 or less, the hardness being measured by a method in conformity with JIS K 6253-3: 2012 in which: a type A durometer is used as a testing machine; an automatic timer apparatus is not used; a laminate obtained by laminating 6 sheets (30 mm×40 mm) each having a thickness of 1.0 mm or more and 1.5 mm or less is used as a test piece; the test piece is subjected to conditioning at a temperature of 23° C. and a relative humidity of 50% for 24 hours or more, and then a pressure plate is brought into contact with the test piece at a temperature of 23° C. and a relative humidity of 50%; and a measured value 10 seconds after the contact is read. In addition, in each of these cases, each of the one or more shell layers may be composed of a polymer obtained by polymerization of a raw material including one or more kinds selected from a group consisting of a (meth)acrylic acid ester and a vinyl cyanide compound, the polymer having a glass transition temperature of 40° C. or more. In addition, in this case, the conductor covering material may include: 100 parts by weight of the resin component formed of 58.6 parts by weight or more and 73.4 parts by weight or less of the thermoplastic polyurethane resin, and 26.6 parts by weight or more and 41.4 parts by weight or less of the core-shell polymer particles; and 41 parts by weight or more and 87 parts by weight or less of the phosphoric acid ester-based flame retardant. In addition, in each of these cases, the polymer composing each of the one or more shell layers may be a copolymer of one or more kinds selected from a group consisting of the (meth)acrylic acid ester and the vinyl cyanide compound, and an unsaturated monomer capable of copolymerizing therewith.

A manufacturing method for a conductor covering material according to one embodiment of the present invention for solving the above-mentioned problems includes molding a resin raw material including: 100 parts by weight of a resin component formed of 58.1 parts by weight or more and 73.9 parts by weight or less of a thermoplastic polyurethane resin, and 26.1 parts by weight or more and 41.9 parts by weight or less of core-shell polymer particles; and 42 parts by weight or more and 87 parts by weight or less of a phosphoric acid ester-based flame retardant. According to the present invention, the manufacturing method for a conductor covering material having excellent characteristics is provided.

Advantageous Effects of Invention

According to the present invention, the thermoplastic polyurethane resin composition that achieves excellent flame retardancy, the conductor covering material having excellent characteristics, and manufacturing methods therefor are provided.

BRIEF DESCRIPTION OF DRAWINGS

FIG. 5A is an explanatory table for showing the formulation (parts by weight of a thermoplastic polyurethane resin, a phosphoric acid ester-based flame retardant, and core-shell polymer particles) and flame retardancy of each of thermoplastic polyurethane resin compositions and conductor covering materials in Example 1 according to one embodiment of the present invention.

FIG. 5B is an explanatory table for showing the formulation (parts by weight of the core-shell polymer particles with respect to 100 parts by weight of the total of the thermoplastic polyurethane resin and the phosphoric acid ester-based flame retardant) and flame retardancy of each of the thermoplastic polyurethane resin compositions and the conductor covering materials in Example 1 according to one embodiment of the present invention.

FIG. 6 is an explanatory table for showing the formulation and flame retardancy of each of thermoplastic polyurethane resin compositions and conductor covering materials in Example 2 according to one embodiment of the present invention.

FIG. 7 is an explanatory table for showing the formulation, flame retardancy, and Shore A hardness of each of thermoplastic polyurethane resin compositions and conductor covering materials in Example 3 according to one embodiment of the present invention.

FIG. 8 is an explanatory table for showing the formulation and flame retardancy of each of thermoplastic polyurethane resin compositions and conductor covering materials in Example 4 according to one embodiment of the present invention.

FIG. 9 is an explanatory table for showing the formulation and flame retardancy of each of thermoplastic polyurethane resin compositions and conductor covering materials in Example 5 according to one embodiment of the present invention.

FIG. 10 is an explanatory table for showing the formulation and flame retardancy of each of thermoplastic polyurethane resin compositions and conductor covering materials in Example 6 according to one embodiment of the present invention.

FIG. 11 is an explanatory table for showing the formulation and flame retardancy of each of thermoplastic polyurethane resin compositions and conductor covering materials in Example 7 according to one embodiment of the present invention.

FIG. 12 is an explanatory table for showing the formulation and flame retardancy of each of thermoplastic polyurethane resin compositions and conductor covering materials in Example 8 according to one embodiment of the present invention.

FIG. 13 is an explanatory table for showing the flame retardancy, and Shore A hardness of each of thermoplastic polyurethane resin compositions and conductor covering materials in Example 9 according to one embodiment of the present invention.

FIG. 14 is an explanatory table for showing the formulation and flame retardancy of each of thermoplastic polyurethane resin compositions and conductor covering materials in Example 10 according to one embodiment of the present invention.

FIG. 15 is an explanatory table for showing the formulation and flame retardancy of each of thermoplastic polyurethane resin compositions and conductor covering materials in Example 11 according to one embodiment of the present invention.

DESCRIPTION OF EMBODIMENTS

Embodiments of the present invention will be described below. The present invention is not limited to these embodiments.

A conductor covering material according to one embodiment of the present invention (covering material of the present invention) is a member covering a conductor. The conductor to be covered with the covering material of the present invention is not particularly limited as long as the conductor is a member for conducting electricity. The conductor may be, for example, a metal conductor. A metal composing the metal conductor is not particularly limited as long as the metal conducts electricity, and may be, for example, one or more kinds selected from a group consisting of copper, soft copper, nickel-plated soft copper, tin-plated soft copper, silver, aluminum, gold, iron, tungsten, molybdenum, and chromium. The conductor may be a wire. In this case, the conductor may be a metal wire.

FIG. 1, FIG. 2, FIG. 3, and FIG. 4 are each an explanatory view for illustrating a section of an example of the covering material of the present invention. In each of the examples illustrated in FIG. 1 to FIG. 4, the covering material of the present invention is a wire covering material which covers a wire. More specifically, in each of the examples illustrated in FIG. 1 to FIG. 4, the covering material of the present invention is a wire covering material of an electric wire 1 or a cable 2.

Figure 1:
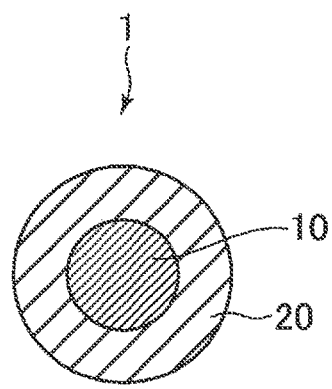
FIG. 1 is an explanatory view for illustrating a section of an example of a conductor covering material according to one embodiment of the present invention.
Figure 2:
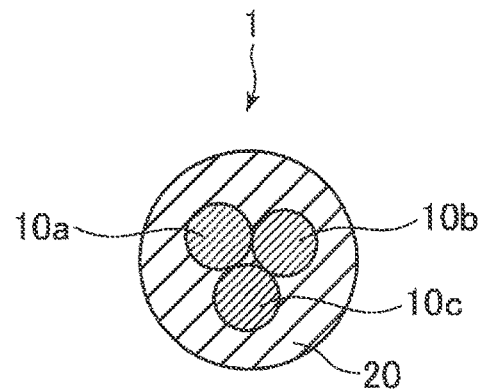
FIG. 2 is an explanatory view for illustrating a section of another example of the conductor covering material according to one embodiment of the present invention.

FIG. 1 is an illustration of the electric wire 1 including a conductor (wire) 10 and a covering material 20 covering the conductor 10. FIG. 2 is an illustration of the electric wire 1 including a plurality of wires 10a, 10b, and 10c, and the covering material 20 covering the plurality of wires 10a, 10b, and 10c in a lump.

The covering material of the present invention may be such covering material 20 for the electric wire 1 as illustrated in each of FIG. 1 and FIG. 2. The electric wire 1 is a so-called insulated electric wire, and the covering material 20 may be an insulating covering material for the insulated electric wire. When the covering material of the present invention covers a wire, the number of the wire(s) to be covered with the covering material of the present invention is not particularly limited as long as the number is one or more as illustrated in each of FIG. 1 and FIG. 2.

Figure 3:
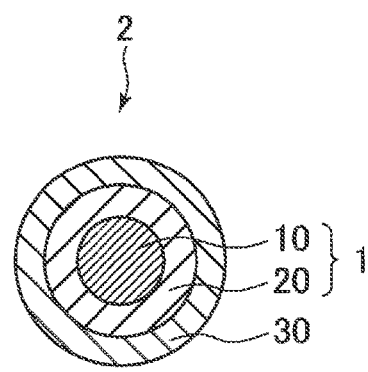
FIG. 3 is an explanatory view for illustrating a section of still another example of the conductor covering material according to one embodiment of the present invention.

FIG. 3 is an illustration of the cable 2 including the conductor (wire) 10, a first covering material 20 covering the conductor 10, and a second covering material 30 covering the first covering material 20 (a second covering material 30 covering the conductor 10 through intermediation of the first covering material 20). In this case, the cable 2 may include the electric wire 1 including the conductor 10 and the first covering material 20, and the second covering material 30 covering the electric wire 1.

The covering material of the present invention may be such covering material 20 or 30 for the cable 2 as illustrated in FIG. 3. That is, the covering material of the present invention may be the first covering material 20 and/or the second covering material 30 illustrated in FIG. 3, and may be preferably the second covering material 30. The electric wire 1 is an insulated electric wire, and the first covering material 20 may be an insulating covering material for the insulated electric wire. The second covering material 30 may be a protective covering material (so-called sheath) which covers the electric wire 1.

Figure 4:
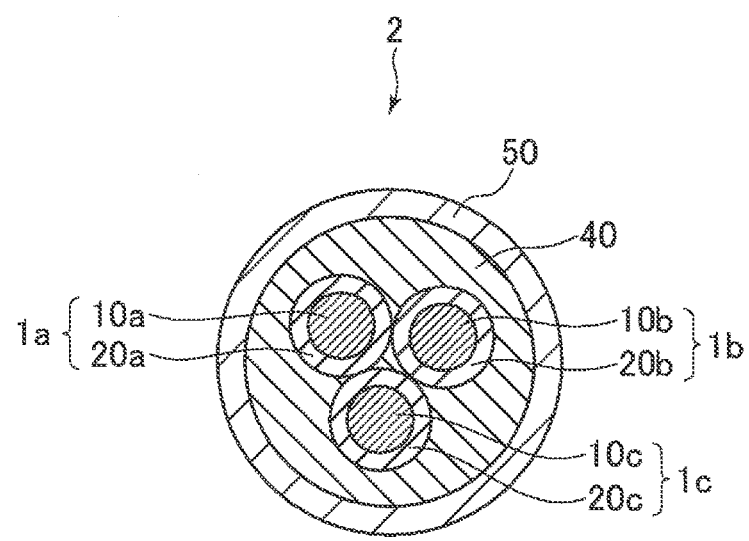
FIG. 4 is an explanatory view for illustrating a section of yet still another example of the conductor covering material according to one embodiment of the present invention.

FIG. 4 is an illustration of the cable 2 including: the plurality of wires 10a, 10b, and 10c; a plurality of first covering materials 20a, 20b, and 20c covering the plurality of wires 10a, 10b, and 10c; a second covering material 40 covering the plurality of first covering materials 20a, 20b, and 20c (a second covering material 40 covering the plurality of wires 10a, 10b, and 10c through intermediation of the plurality of first covering materials 20a, 20b, and 20c); and a third covering material 50 covering the second covering material 40 (a third covering material 50 covering the plurality of wires 10a, 10b, and 10c through intermediation of the plurality of first covering materials 20a, 20b, and 20c, and the second covering material 40). In this case, the cable 2 may include: an electric wire 1a including the conductor 10a and the first covering material 20a; an electric wire 1b including the conductor 10b and the first covering material 20b; an electric wire 1c including the conductor 10c and the first covering material 20c; and the second covering material 20 covering the plurality of electric wires 1a, 1b, and 1c in a lump.

The covering material of the present invention may be such covering material 20a, 20b, 20c, 40, or 50 for the cable 2 as illustrated in FIG. 4. That is, the covering material of the present invention may be one or more selected from a group consisting of the first covering materials 20a, 20b, and 20c, the second covering material 40, and the third covering material 50 illustrated in FIG. 4. When the covering material of the present invention is a covering material for the cable 2, the number of wires to be covered with the covering material of the present invention is not particularly limited as long as the number is one or more as illustrated in each of FIG. 3 and FIG. 4. The plurality of electric wires 1a, 1b, and 1c may be insulated electric wires, and the first covering materials 20 may be insulating covering materials for the insulated electric wires. The second covering material 40 and the third covering material 50 may be protective covering materials (so-called sheaths) which covers the electric wires 1.

When the covering material of the present invention is such covering material for an electric wire or a cable as described above, the electric wire and the cable may be selected from a group consisting of, for example, an electric wire or a cable for power supply, an electric wire or a cable for communication, and an electric wire or a cable for an electric apparatus (e.g., one or more selected from a group consisting of a wiring, a plug, and a connector for a home appliance part, an electrical part, an electronic part, or an automobile part).

The covering material of the present invention includes a thermoplastic polyurethane resin (referred to as "TPU" herein), a phosphoric acid ester-based flame retardant (referred to as "PE flame retardant" herein), and core-shell polymer particles (referred to as "CS particles" herein).

The covering material of the present invention is manufactured by a method including molding a resin raw material containing the TPU, the PE flame retardant, and the CS particles. The resin raw material to be used in the manufacture of the covering material of the present invention is a resin raw material for molding a conductor covering material.

A thermoplastic polyurethane resin composition according to one embodiment of the present invention (composition of the present invention) contains the thermoplastic polyurethane resin (TPU), the phosphoric acid ester-based flame retardant (PE flame retardant), and the core-shell polymer particles (CS particles). The covering material of the present invention described above is manufactured by using the composition of the present invention as a resin raw material. That is, the composition of the present invention may be a thermoplastic polyurethane resin composition for a conductor covering material. Therefore, this embodiment includes a use of the composition of the present invention for manufacturing a conductor covering material, a method of using the composition of the present invention for manufacturing a conductor covering material, and a method of manufacturing a conductor covering material by using the composition of the present invention (more specifically, a method including molding the composition of the present invention to manufacture a conductor covering material).

The inventors of the present invention have made extensive investigations on technical means for improving the flame retardancy of each of a thermoplastic polyurethane resin composition and a conductor covering material each containing the TPU and the PE flame retardant. As a result, the inventors have found, on their own account, that the CS particles unexpectedly impart high flame retardancy to each of the composition and the conductor covering material, and have completed the present invention.

In view of the foregoing, the composition of the present invention and the covering material of the present invention are a composition and a conductor covering material each containing the TPU and the PE flame retardant, and each further contain the CS particles as a flame retardant. That is, the CS particles are a component which exhibits flame retardancy in each of the composition of the present invention and the covering material of the present invention. Accordingly, this embodiment includes a method of using the CS particles as a flame retardant for each of a thermoplastic polyurethane resin composition and a conductor covering material each containing the TPU and the PE flame retardant.

In addition, the inventors of the present invention have made extensive investigations on technical means for improving the flame retardancy of each of a thermoplastic polyurethane resin composition and a conductor covering material. As a result, the inventors have found, on their own account, that particularly high flame retardancy is unexpectedly achieved by adding the CS particles in an amount in a specific range to each of the thermoplastic polyurethane resin composition and the conductor covering material each containing the TPU and the PE flame retardant, and have completed the present invention.

In view of the foregoing, the composition of the present invention and the covering material of the present invention may each contain: 100 parts by weight of a resin component formed of 58.1 parts by weight or more and 73.9 parts by weight or less of the TPU, and 26.1 parts by weight or more and 41.9 parts by weight or less of the CS particles; and 42 parts by weight or more and 87 parts by weight or less of the PE flame retardant.

In addition, the composition of the present invention and the covering material of the present invention may each contain 21.9 parts by weight or more and 40.7 parts by weight or less of a flame retardant formed of the CS particles with respect to 100 parts by weight of the total of the TPU and the PE flame retardant. In this case, the covering material of the present invention may contain: 63.2 parts by weight or more and 135.3 parts by weight or less of the PE flame retardant with respect to 100 parts by weight of the TPU; and 23.0 parts by weight or more and 40.7 parts by weight or less of the flame retardant formed of the CS particles with respect to 100 parts by weight of the total of the TPU and the PE flame retardant.

In addition, the composition of the present invention and the covering material of the present invention may each contain: 100 parts by weight of a resin component formed of 59.1 parts by weight or more and 73.9 parts by weight or less of the TPU, and 26.1 parts by weight or more and 40.9 parts by weight or less of the CS particles; and 42 parts by weight or more and 87 parts by weight or less of the PE flame retardant. In this case, the composition of the present invention and the covering material of the present invention each exhibit extremely excellent flame retardancy.

In addition, 100 parts by weight of the resin component preferably contains 59.2 parts by weight or more and 73.7 parts by weight or less of the TPU, and more preferably contains 59.5 parts by weight or more and 73.5 parts by weight or less of the TPU. In each of these cases, the composition of the present invention and the covering material of the present invention each exhibit more excellent flame retardancy.

In addition, 100 parts by weight of the resin component preferably contains 26.2 parts by weight or more and 40.7 parts by weight or less of the CS particles, and more preferably contains 26.5 parts by weight or more and 40.5 parts by weight or less of the CS particles. In each of these cases, the composition of the present invention and the covering material of the present invention each exhibit more excellent flame retardancy.

More specifically, 100 parts by weight of the resin component preferably includes 59.2 parts by weight or more and 73.7 parts by weight or less of the TPU, and 26.2 parts by weight or more and 40.7 parts by weight or less of the CS particles, and more preferably includes 59.5 parts by weight or more and 73.5 parts by weight or less of the TPU, and 26.5 parts by weight or more and 40.5 parts by weight or less of the CS particles. In each of these cases, the composition of the present invention and the covering material of the present invention each exhibit more excellent flame retardancy.

In addition, the composition of the present invention and the covering material of the present invention each preferably contain 100 parts by weight of the resin component, and 42 parts by weight or more and 87 parts by weight or less of the PE flame retardant, and each more preferably contain 43 parts by weight or more and 85 parts by weight or less of the PE flame retardant. In each of these cases, the composition of the present invention and the covering material of the present invention each exhibit more excellent flame retardancy.

More specifically, the composition of the present invention and the covering material of the present invention may each contain: 100 parts by weight of the resin component formed of 59.2 parts by weight or more and 73.7 parts by weight or less of the TPU, and 26.2 parts by weight or more and 40.7 parts by weight or less of the CS particles; and 42 parts by weight or more and 87 parts by weight or less of the PE flame retardant. In this case, the composition of the present invention and the covering material of the present invention each exhibit more excellent flame retardancy.

Further, the composition of the present invention and the covering material of the present invention may each contain: 100 parts by weight of the resin component formed of 59.5 parts by weight or more and 73.5 parts by weight or less of the TPU, and 26.5 parts by weight or more and 40.5 parts by weight or less of the CS particles; and 43 parts by weight or more and 85 parts by weight or less of the PE flame retardant. In this case, the composition of the present invention and the covering material of the present invention each exhibit particularly excellent flame retardancy.

The composition of the present invention and the covering material of the present invention may each further contain any other component in addition to the TPU, the CS particles, and the PE flame retardant. In addition, in this embodiment, the "resin component" consists of the TPU and the CS particles. The composition of the present invention and the covering material of the present invention may each contain a resin in addition to the "resin component". However, the composition of the present invention and the covering material of the present invention each preferably contain, as a resin, only the "resin component" consisting of the TPU and the CS particles.

The TPU in each of the composition of the present invention and the covering material of the present invention is not particularly limited as long as the TPU is a polyurethane resin having thermoplasticity, the resin being synthesized by a reaction between a polyisocyanate and a polyol. Although the kind of the TPU is not particularly limited, the TPU may be one or more kinds selected from a group consisting of a polyester-based TPU, a polyether-based TPU, and a polycarbonate-based TPU, and more specifically, may be one or more kinds selected from a group consisting of an adipate-based TPU, a caprolactone-based TPU, a polyether-based TPU, and a polycarbonate-based TPU. The TPU is most preferably a polyester-based TPU because of a reason to be described later, and is second most preferably a polycarbonate-based TPU.

The composition of the present invention and the covering material of the present invention may each contain a polyester-based TPU. In a case where the composition of the present invention and the covering material of the present invention each contain the polyester-based TPU (an adipate-based TPU and/or a caprolactone-based TPU), the composition of the present invention and the covering material of the present invention each have excellent heat resistance in addition to excellent flame retardancy.

In this case, the covering material of the present invention maintains an excellent tensile elongation characteristic even after having been, for example, heated at a predetermined temperature for a predetermined time period (e.g., at 136° C. for 168 hours). Specifically, with regard to, for example, a tensile elongation characteristic after heating at a predetermined temperature for a predetermined time period (e.g., at 136° C. for 168 hours), a test piece of the composition of the present invention and the covering material of the present invention each containing the polyester-based TPU are much more excellent than a test piece of the composition of the present invention and the covering material of the present invention each containing a polyether-based TPU. In addition, for example, the heat resistance of each of the composition of the present invention and the covering material of the present invention each containing the polyester-based TPU is more excellent than that of each of the composition of the present invention and the covering material of the present invention each containing a polycarbonate-based TPU. Particularly in a case where the composition of the present invention and the covering material of the present invention each contain an adipate-based TPU, the composition of the present invention and the covering material of the present invention each have both of an extremely high degree of flame retardancy and the above-mentioned excellent heat resistance. In addition, the processability of each of the composition of the present invention and a resin raw material for the covering material of the present invention each containing the polyester-based TPU is more excellent than that of each of the composition of the present invention and the resin raw material each containing the polycarbonate-based TPU, and that of each of the composition of the present invention and the resin raw material each containing the polyether-based TPU.

The composition of the present invention and the covering material of the present invention may each contain a polycarbonate-based TPU. In a case where the composition of the present invention and the covering material of the present invention each contain the polycarbonate-based TPU, the composition of the present invention and the covering material of the present invention each have excellent heat resistance in addition to excellent flame retardancy. That is, in this case, each of a test piece of the composition of the present invention and the covering material of the present invention maintains an excellent tensile elongation characteristic even after having been, for example, heated at a predetermined temperature for a predetermined time period (e.g., at 136° C. for 168 hours). Specifically, with regard to, for example, a tensile elongation characteristic after heating at a predetermined temperature for a predetermined time period (e.g., at 136° C. for 168 hours), the test piece of the composition of the present invention and the covering material of the present invention each containing the polycarbonate-based TPU are much more excellent than a test piece of the composition of the present invention and the covering material of the present invention each containing a polyether-based TPU.

The composition of the present invention and the covering material of the present invention may each contain a polyether-based TPU. Also in a case where the composition of the present invention and the covering material of the present invention each contain the polyether-based TPU, the composition of the present invention and the covering material of the present invention each have excellent flame retardancy.

The TPU may be a TPU having a flow starting point of 155° C. or more. Although the flow starting point of the TPU is not particularly limited as long as the flow starting point is 155° C. or more, the flow starting point may be, for example, 160° C. or more, and is preferably 170° C. or more, more preferably 175° C. or more, particularly preferably 180° C. or more. When the flow staring point of the TPU is 175° C. or more, especially 180° C. or more, the composition of the present invention and the covering material of the present invention each containing the TPU each have excellent heat resistance in addition to excellent flame retardancy.

That is, the composition of the present invention and the covering material of the present invention may each contain a polyester-based TPU having a flow starting point of 155° C. or more, 160° C. or more, 170° C. or more, 175° C. or more, or 180° C. or more, may each contain an adipate-based TPU having a flow starting point of 155° C. or more, 160° C. or more, 170° C. or more, 175° C. or more, or 180° C. or more, may each contain a caprolactone-based TPU having a flow starting point of 155° C. or more, 160° C. or more, 170° C. or more, 175° C. or more, or 180° C. or more, may each contain a polycarbonate-based TPU having a flow starting point of 155° C. or more, 160° C. or more, 170° C. or more, 175° C. or more, or 180° C. or more, or may each contain a polyether-based TPU having a flow starting point of 155° C. or more, 160° C. or more, 170° C. or more, 175° C. or more, or 180° C. or more.

Although an amount of the TPU in each of the composition of the present invention and the covering material of the present invention is not particularly limited, each of the composition of the present invention and the covering material of the present invention may contain, for example, 30 wt % to 60 wt % of the TPU, and preferably contains 30 wt % to 55 wt % of the TPU, and more preferably contains 35 wt % to 55 wt % of the TPU.

As described above, the CS particles exhibit flame retardancy in each of a thermoplastic polyurethane resin composition and a conductor covering material each containing the TPU, and in each of a thermoplastic polyurethane resin composition and a conductor covering material each containing the TPU and the PE flame retardant. That is, the CS particles are, for example, the following CS particles: in such a flame retardancy test as described below, the CS particles reduce the flame-out time of a test piece of each of a thermoplastic polyurethane resin composition and a conductor covering material each containing the TPU, the PE flame retardant, and the CS particles so that the flame-out time is shorter than the flame-out time of a test piece of each of a thermoplastic polyurethane resin composition and a conductor covering material each of which contains the TPU and the PE flame retardant, and is free of the CS particles.

The flame retardancy test is performed as described below by using a test piece (measuring 125 mm by 13 mm by 3 mm), which is produced by punching a sheet manufactured from a thermoplastic polyurethane resin composition or a sheet of a conductor covering material with a punching blade, and an HVUL testing machine (manufactured by Atlas) serving as an UL burning testing machine. (1) First, the test piece is vertically suspended by fixing the upper end of the test piece to a clamp so that one end of the test piece in its longitudinal direction is on an upper side, and the other end thereof is on a lower side. (2) Next, a burner flame having a length of 20 mm is provided, and the upper portion of the burner flame having a length of 10 mm is brought into contact with the central portion of the lower end of the test piece for 10 seconds. (3) After that, a time period from the time point when the burner flame is isolated from the test piece to the time point when the flame of the test piece disappears (flame-out time) is measured. When the test piece does not burn at all after the completion of the flame contact treatment, the flame-out time is defined as zero seconds. In addition, when the dripping of the test piece occurs and when the test piece burns out, the flame-out time cannot be measured.

The CS particles are polymer particles each having a core-shell structure. That is, each of the CS particles includes one or more core layers and one or more shell layers. When each of the CS particles includes two or more core layers, polymers composing the two or more core layers may be different from each other in composition. In addition, when each of the CS particles includes two or more shell layers, polymers composing the two or more shell layers may be different from each other in composition.

The volume-average particle diameter of the primary particles of the CS particles may be, for example, from 10 nm to 10,000 nm, and is preferably from 50 nm to 1,000 nm. In this case, the volume-average particle diameter of the primary particles of the CS particles is the volume-average particle diameter of a latex of the CS particles. The volume-average particle diameter of the primary particles of the CS particles is measured by a laser diffraction method, and is measured with, for example, MICROTRAC UPA150 (trademark) (manufactured by Nikkiso Co., Ltd.).

The CS particles are manufactured by an emulsion polymerization method, a dispersion polymerization method, a microsuspension polymerization method, or a suspension polymerization method, and are preferably manufactured by the emulsion polymerization method.

The core layer is a particle which is composed of a polymer (polymer particle). The core layer may be a particle which is composed of a crosslinked polymer. In this case, the core layer may be a particle which is composed of a crosslinked rubber.

As described above, the CS particles each include one or more core layers. That is, the CS particles may each include one core layer, or may each include two or more core layers. However, it is preferred that the CS particles each include the one core layer (the CS particles each include one or more shell layers and the one core layer, or each include one shell layer and the one core layer).

The core layers include an outermost core layer composed of a polymer having a glass transition temperature (Tg) of less than 40° C. That is, when the CS particles each include one core layer (the core layer of each of the CS particles is formed of one core layer), the one core layer is the outermost core layer, and is composed of the polymer having a glass transition temperature of less than 40° C.

Meanwhile, when the CS particles each include two or more core layers, the two or more core layers may consist of: one innermost core layer particle constituting the innermost layer of each of the CS particles; and one or more covering core layers covering the innermost core layer particle.

That is, in a case where the CS particles each include two core layers, the two core layers are formed of: one innermost core layer particle constituting the innermost layer of each of the CS particles; and one covering core layer covering the innermost core layer particle. In this case, the one covering core layer covering the innermost core layer particle is the outermost core layer.

In addition, in a case where the CS particles each include three or more core layers, the three or more core layers may consist of: one innermost core layer particle constituting the innermost layer of each of the CS particles; and two or more covering core layers covering the innermost core layer particle. In this case, a covering core layer on the outermost side of each of the CS particles in its radial direction out of the two or more covering core layers is the outermost core layer. That is, when the CS particles each include three core layers formed of one innermost core layer particle, a first covering core layer covering the innermost core layer particle, and a second covering core layer covering the first covering core layer, the second covering core layer is the outermost core layer.

The two or more core layers may include one or more core layers each composed of a polymer having a glass transition temperature of 40° C. or more in addition to the outermost core layer. That is, the two or more core layers may consist of: the outermost core layer composed of a polymer having a glass transition temperature of less than 40° C.; and one or more core layers each composed of a polymer having a glass transition temperature of 40° C. or more and/or one or more core layers each composed of a polymer having a glass transition temperature of less than 40° C.

In addition, the two or more core layers may include two or more core layer particles. That is, the two or more core layers may consist of two or more core layer particles, or may consist of the two or more core layer particles and one or more covering core layers covering the two or more core layer particles. When the two or more core layers consist of two or more core layer particles, each of the two or more core layer particles is the outermost core layer. In addition, when the two or more core layers consist of two or more core layer particles and one or more covering core layers covering the two or more core layer particles, a core layer constituting the outermost layer out of the one or more covering core layers is the outermost core layer. However, the CS particles each preferably include not two or more but one innermost core layer particle.

The glass transition temperature of the outermost core layer is preferably 35° C. or less, particularly preferably 23° C. or less. That is, the core layer may be a particle composed of a polymer having a glass transition temperature of 23° C. or less. Specifically, the CS particles may each include one core layer composed of a polymer having a glass transition temperature of 23° C. or less. In this case, the CS particles each preferably include: one core layer composed of a polymer having a glass transition temperature of 23° C. or less; and one shell layer composed of a polymer having a glass transition temperature of 40° C. or more. The core layer may be a particle composed of a crosslinked polymer having a glass transition temperature of 23° C. or less, or may be a particle composed of a crosslinked rubber having a glass transition temperature of 23° C. or less.

The glass transition temperature of the core layer is, for example, preferably 0° C. or less, more preferably −23° C. or less. That is, the core layers preferably include the outermost core layer composed of a polymer having a glass transition temperature of 0° C. or less, and more preferably include the outermost core layer composed of a polymer having a glass transition temperature of −23° C. or less. In this case, the core layers preferably include one core layer composed of a polymer having a glass transition temperature of 0° C. or less, and more preferably include one core layer composed of a polymer having a glass transition temperature of −23° C. or less. Further, in this case, the CS particles each preferably include one core layer composed of a polymer having a glass transition temperature of 0° C. or less, and one or more shell layers each composed of a polymer having a glass transition temperature of 40° C. or more, and each more preferably include one core layer composed of a polymer having a glass transition temperature of −23° C. or less, and one or more shell layers each composed of a polymer having a glass transition temperature of 40° C. or more. In addition, the CS particles each preferably include one core layer composed of a polymer having a glass transition temperature of 0° C. or less, and one shell layer composed of a polymer having a glass transition temperature of 40° C. or more, and each more preferably include one core layer composed of a polymer having a glass transition temperature of −23° C. or less, and one shell layer composed of a polymer having a glass transition temperature of 40° C. or more. The glass transition temperature of the core layer may be, for example, −140° C. or more. The glass transition temperature is measured with a differential scanning calorimeter (DSC).

In this case, the glass transition temperature (Tg) is measured by differential scanning calorimetry. However, in this embodiment, the glass transition temperature is determined from Fox's calculation equation, and is calculated by the following equation (1): $1/(273+Tg)=\Sigma(Wi/(273+Tgi))$. However, the usage amount of a polyfunctional monomer is not used in the calculation because the usage amount of the polyfunctional monomer is very small.

In the equation, Tg represents the glass transition temperature (° C.) of a copolymer, Tgi represents the glass transition temperature (° C.) of a homopolymer of a component i, and Wi represents the mass ratio of the component i ($\Sigma Wi=1$). In addition, a value described in the "POLYMER HANDBOOK FOURTH EDITION Volume 1, J. Brandrup, Interscience, 1989" edited by The Society of Polymer Science, Japan is used as the glass transition temperature of the homopolymer of the component i.

When the glass transition temperature (Tg) is measured through the use of differential scanning calorimetry, the glass transition temperature to be measured is changed by measurement conditions, such as the shape of a measurement test piece and a rate of temperature increase. Accordingly, the measurement conditions need to be optimized so that the value described in the POLYMER HANDBOOK is obtained for each component in the polymer.

The cross-linked polymer composing the core layer may be one or more kinds selected from a group consisting of an acrylic rubber, a butadiene rubber, a styrene-butadiene rubber, a silicon rubber, and an acrylonitrile-butadiene rubber, or may be one or more kinds selected from a group consisting of an acrylic rubber, a butadiene rubber, a styrene-butadiene rubber, and a silicon rubber, and is preferably one or more kinds selected from a group consisting of an acrylic rubber, a butadiene rubber, and a styrene-butadiene rubber, more preferably one or more kinds selected from a group consisting of an acrylic rubber and a styrene-butadiene rubber, particularly preferably an acrylic rubber.

The acrylic rubber may be a copolymer of an acrylic acid ester, a polyfunctional monomer, and an unsaturated monomer capable of copolymerizing therewith. In this case, the acrylic rubber may be a copolymer of 60.0 wt % to 99.9 wt % of the acrylic acid ester, 0.1 wt % to 30.0 wt % of the polyfunctional monomer, and 0 wt % to 39.9 wt % of the unsaturated monomer capable of copolymerizing therewith. In addition, the acrylic rubber may be a copolymer of 60.0 wt % to 99.9 wt % of the acrylic acid ester, 0.1 wt % to 10.0 wt % of the polyfunctional monomer, and 0 wt % to 39.9 wt % of the unsaturated monomer capable of copolymerizing therewith.

The acrylic acid ester may have an alkyl group and/or an epoxy group. The acrylic acid ester may have an alkyl group having 1 to 22 carbon atoms, or may have an alkyl group having 1 to 12 carbon atoms.

The acrylic acid ester having an alkyl group may be one or more kinds selected from a group consisting of an acrylic acid alkyl ester (e.g., one or more kinds selected from a group consisting of methyl acrylate, ethyl acrylate, propyl acrylate, butyl acrylate, 2-ethylhexyl acrylate, octyl acrylate, dodecyl acrylate, stearyl acrylate, and behenyl acrylate), an acrylic acid hydroxyalkyl ester (one or more kinds selected from a group consisting of 2-hydroxyethyl acrylate and 4-hydroxybutyl acrylate), and an acrylic acid alkoxyalkyl ester (e.g., one or more kinds selected from a group consisting of methoxymethyl acrylate, methoxyethyl acrylate, ethoxymethyl acrylate, and ethoxyethyl acrylate). The acrylic acid ester having an epoxy group may be glycidyl acrylate.

Although the polyfunctional monomer is not particularly limited as long as the monomer has, in a molecule thereof, a plurality of functional groups each containing a polymerizable unsaturated bond (e.g., a radical polymerizable functional group (specifically, for example, one or more kinds selected from a group consisting of an acrylate group, a methacrylate group, and an allyl group)), the monomer may be one or more kinds selected from a group consisting of: an allylalkyl (meth)acrylate (e.g., one or more kinds selected from a group consisting of allyl (meth)acrylate and an allylalkyl (meth)acrylate); a polyfunctional (meth)acrylate (e.g., one or more kinds selected from a group consisting of ethylene glycol di(meth)acrylate, 1,3-butanediol di(meth)acrylate, triethylene glycol di(meth)acrylate, tetraethylene glycol di(meth)acrylate, and a polypropylene glycol di(meth)acrylate); diallyl phthalate; triallyl cyanurate; triallyl isocyanurate (TAIC); glycidyl diallyl isocyanurate; and divinylbenzene.

In this description, the (meth)acrylate refers to an acrylate and/or a methacrylate. That is, the (meth)acrylate may be an acrylate, may be a methacrylate, or may be an acrylate and a methacrylate.

Although the unsaturated monomer capable of copolymerizing with the acrylic acid ester and the polyfunctional monomer is not particularly limited as long as the monomer has a copolymerizable double bond, the monomer may be, for example, one or more kinds selected from a group consisting of: a methacrylic acid ester (e.g., a methacrylic acid ester having an alkyl group (e.g., an alkyl group having 1 to 22 carbon atoms or an alkyl group having 1 to 12 carbon atoms) (e.g., one or more kinds selected from a group consisting of a methacrylic acid alkyl ester (e.g., one or more kinds selected from a group consisting of methyl methacrylate, ethyl methacrylate, propyl methacrylate, butyl methacrylate, 2-ethylhexylmethacrylate, octyl methacrylate, dodecyl methacrylate, stearyl methacrylate, and behenyl methacrylate), a methacrylic acid hydroxyalkyl ester (one or more kinds selected from a group consisting of 2-hydroxyethyl methacrylate and 4-hydroxybutyl methacrylate), and a methacrylic acid alkoxyalkyl ester (e.g., one or more kinds selected from a group consisting of methoxymethyl methacrylate, methoxyethyl methacrylate, ethoxymethyl methacrylate, and ethoxyethyl methacrylate)) and/or a methacrylic acid ester having an epoxy group (e.g., glycidyl methacrylate)); a vinylarene (e.g., one or more kinds selected from a group consisting of styrene, α-methylstyrene, 1-vinylnaphthalene, 2-vinylnaphthalene, monochlorostyrene, dichlorostyrene, and bromostyrene); a vinyl carboxylic acid (e.g., one or more kinds selected from a group consisting of acrylic acid, methacrylic acid, maleic anhydride, itaconic acid, fumaric acid, and mesaconic acid); a vinyl halide (e.g., one or more kinds selected from a group consisting of vinyl chloride, vinyl bromide, and chloroprene); vinyl acetate; and an alkene (e.g., one or more kinds selected from a group consisting of ethylene, propylene, butylene, and isobutylene).

Although the amount of the core layer in each of the CS particles is not particularly limited, the CS particles each preferably include, for example, 41 wt % or more of the core layer (preferably a rubber layer composed of an acrylic rubber). That is, the ratio of the weight of the core layer to the weight of the CS particle (the total of the weight of the core layer and the weight of the shell layer) is preferably 41 wt % or more.

In this case, the CS particles may each include 45 wt % or more of the core layer, or may each include 50 wt % or more of the core layer. More specifically, the CS particles each preferably include 41 wt % or more and 98 wt % or less of the core layer, and in this case, the particles may each include 45 wt % or more and 98 wt % or less of the core layer, or may each include 50 wt % or more and 98 wt % or less of the core layer. In each of these cases, the amount of the core layer in each of the CS particles may be 97 wt % or less, may be 96 wt % or less, may be 95 wt % or less, or may be 94 wt % or less.

Further, the CS particles each preferably include 41 wt % or more and 84 wt % or less of the core layer (preferably a rubber layer composed of an acrylic rubber). In this case, the CS particles may each include 41 wt % or more and 80 wt % or less of the core layer, or may each include 41 wt % or more and 75 wt % or less of the core layer. In addition, the CS particles may each include 45 wt % or more and 80 wt % or less of the core layer, or may each include 45 wt % or more and 75 wt % or less of the core layer. In addition, the CS particles may each include 50 wt % or more and 80 wt % or less of the core layer, or may each include 50 wt % or more and 75 wt % or less of the core layer.

The shell layer covers at least part of the core layer. That is, the shell layer is composed of a polymer covering at least part of the core layer. More specifically, the shell layer is composed of a polymer covering at least part of the surface of a polymer particle constituting the core layer.

As described above, the CS particles each include one or more shell layers. That is, the CS particles may each include one shell layer, or may each include two or more shell layers. However, it is preferred that the CS particles each include the one shell layer (the CS particles each include the one shell layer and one or more core layers, or each include the one shell layer and one core layer).

A polymer composing the shell layer may be a graft polymer. That is, the shell layer may be composed of a graft polymer formed by graft polymerization to the core layer.

The shell layer may be composed of a polymer having a glass transition temperature of 40° C. or more. For example, the glass transition temperature of the shell layer may be 60° C. or more, or may be 80° C. or more. For example, the glass transition temperature of the shell layer may be 160° C. or less, or may be 150° C. or less.

The shell layer may be composed of an acrylic copolymer. In a case where the CS particles each include two or more shell layers, the shell layer on the outermost side may be composed of the acrylic copolymer, or each of the two or more shell layers may be composed of the acrylic copolymer.

In this case, the shell layer may be a copolymer of one or more kinds selected from a group consisting of a (meth)acrylic acid ester and a vinyl cyanide compound, and an unsaturated monomer capable of copolymerizing therewith, may be a copolymer obtained by the polymerization of raw materials including one or more kinds selected from a group consisting of the (meth)acrylic acid ester and the vinyl cyanide compound, and a polyfunctional monomer, or may be a copolymer of one or more kinds selected from a group consisting of the (meth)acrylic acid ester and the vinyl cyanide compound, the polyfunctional monomer, and an unsaturated monomer capable of copolymerizing therewith. Specifically, the shell layer may be a copolymer of 60.0 wt % to 99.9 wt % of one or more kinds of monomers selected from a group consisting of the (meth)acrylic acid ester and the vinyl cyanide compound, 0.1 wt % to 30.0 wt % of the polyfunctional monomer, and 0 wt % to 39.9 wt % of the unsaturated monomer capable of copolymerizing therewith. In addition, the shell layer may be a copolymer of 60.0 wt % to 99.9 wt % of one or more kinds of monomers selected from a group consisting of the (meth)acrylic acid ester and the vinyl cyanide compound, 0.1 wt % to 10.0 wt % of the polyfunctional monomer, and 0 wt % to 39.9 wt % of the unsaturated monomer capable of copolymerizing therewith.

In this description, the (meth)acrylic acid ester refers to an acrylic acid ester and/or a methacrylic acid ester. That is, the (meth)acrylic acid ester may be an acrylic acid ester, may be a methacrylic acid ester, or may be an acrylic acid ester and a methacrylic acid ester.

The (meth)acrylic acid ester may have an alkyl group and/or an epoxy group. The (meth)acrylic acid ester may have an alkyl group having 1 to 22 carbon atoms, or may have an alkyl group having 1 to 12 carbon atoms.

The (meth)acrylic acid ester having an alkyl group may be one or more kinds selected from a group consisting of: a (meth)acrylic acid alkyl ester (e.g., one or more kinds selected from a group consisting of methyl (meth)acrylate, ethyl (meth)acrylate, propyl (meth)acrylate, butyl (meth)acrylate, 2-ethylhexyl (meth)acrylate, octyl (meth)acrylate, dodecyl (meth)acrylate, stearyl (meth)acrylate, and behenyl (meth)acrylate); a (meth)acrylic acid hydroxyalkyl ester (e.g., one or more kinds selected from a group consisting of 2-hydroxyethyl (meth)acrylate and 4-hydroxybutyl (meth)acrylate); and an acrylic acid alkoxyalkyl ester (e.g., one or more kinds selected from a group consisting of methoxymethyl (meth)acrylate, methoxyethyl (meth)acrylate, ethoxymethyl (meth)acrylate, and ethoxyethyl (meth)acrylate). The (meth)acrylic acid ester having an epoxy group may be glycidyl (meth)acrylate. The vinyl cyanide compound may be (meth)acrylonitrile.

In this description, the (meth)acrylonitrile refers to acrylonitrile and/or methacrylonitrile. That is, the (meth)acrylonitrile may be acrylonitrile, may be methacrylonitrile, or may be acrylonitrile and methacrylonitrile.

Although the polyfunctional monomer is not particularly limited as long as the monomer has, in a molecule thereof, a plurality of functional groups each containing a polymerizable unsaturated bond (e.g., a radical polymerizable functional group (specifically, for example, one or more kinds selected from a group consisting of an acrylate group, a methacrylate group, and an allyl group)), the monomer may be one or more kinds selected from a group consisting of: an allylalkyl (meth)acrylate (e.g., one or more kinds selected from a group consisting of allyl (meth)acrylate and an allylalkyl (meth)acrylate); a polyfunctional (meth)acrylate (e.g., one or more kinds selected from a group consisting of ethylene glycol di(meth)acrylate, 1,3-butanediol di(meth)acrylate, triethylene glycol di(meth)acrylate, tetraethylene glycol di(meth)acrylate, and a polypropylene glycol di(meth)acrylate); diallyl phthalate; triallyl cyanurate; triallyl isocyanurate (TAIC); glycidyl diallyl isocyanurate; and divinylbenzene.

Although the unsaturated monomer capable of copolymerizing with one or more kinds selected from a group consisting of the (meth)acrylic acid ester and the vinyl cyanide compound, and the polyfunctional monomer is not particularly limited as long as the monomer has a copolymerizable double bond, the monomer may be, for example, one or more kinds selected from a group consisting of: a vinylarene (e.g., one or more kinds selected from a group consisting of styrene, α-methylstyrene, 1-vinylnaphthalene, 2-vinylnaphthalene, monochlorostyrene, dichlorostyrene, and bromostyrene); a vinyl carboxylic acid (e.g., one or more kinds selected from a group consisting of acrylic acid, methacrylic acid, maleic anhydride, itaconic acid, fumaric acid, and mesaconic acid); a vinyl halide (e.g., one or more kinds selected from a group consisting of vinyl chloride, vinyl bromide, and chloroprene); vinyl acetate; and an alkene (e.g., one or more kinds selected from a group consisting of ethylene, propylene, butylene, and isobutylene).

The CS particles may each include a shell layer at least part of which is crosslinked. In this case, the shell layer may be as follows: the layer is composed of a copolymer obtained by the polymerization of raw materials including one or more kinds selected from a group consisting of a (meth)acrylic acid ester and a vinyl cyanide compound, and a polyfunctional monomer, or is composed of a copolymer of one or more kinds selected from a group consisting of the (meth)acrylic acid ester and the vinyl cyanide compound, the polyfunctional monomer, and an unsaturated monomer capable of copolymerizing therewith, and at least part of the layer is crosslinked.

More specifically, the shell layer may be as follows: the layer is composed of a copolymer of 60.0 wt % to 99.9 wt % of one or more kinds of monomers selected from a group consisting of the (meth)acrylic acid ester and the vinyl cyanide compound, 0.1 wt % to 30.0 wt % of the polyfunctional monomer, and 0 wt % to 39.9 wt % of the unsaturated monomer capable of copolymerizing therewith, and at least part of the layer is crosslinked. In addition, the shell layer may be as follows: the layer is composed of a copolymer of 60.0 wt % to 99.9 wt % of one or more kinds of monomers selected from a group consisting of the (meth)acrylic acid ester and the vinyl cyanide compound, 0.1 wt % to 10.0 wt % of the polyfunctional monomer, and 0 wt % to 39.9 wt % of the unsaturated monomer capable of copolymerizing therewith, and at least part of the layer is crosslinked.

In a case where the CS particles each include a shell layer at least part of which is crosslinked, the degree of crosslinking of the shell layer is not particularly limited, but the CS particles each preferably include a shell layer having a degree of crosslinking of 0.26% or more. In this case, the particles may each include a shell layer having a degree of crosslinking of 0.30% or more, or may each include a shell layer having a degree of crosslinking of 0.50% or more.

When a shell layer is composed of a copolymer obtained by the polymerization of raw materials including one or more kinds selected from a group consisting of a (meth)acrylic acid ester and a vinyl cyanide compound, and a polyfunctional monomer, the degree of crosslinking of the shell layer is the ratio (wt %) of the weight of the polyfunctional monomer to the weight of the raw materials. More specifically, when the shell layer is composed of a copolymer of one or more kinds selected from a group consisting of the (meth)acrylic acid ester and the vinyl cyanide compound, and the polyfunctional monomer, the degree of crosslinking of the shell layer is the ratio (wt %) of the weight of the polyfunctional monomer to the total of the weight of the one or more kinds selected from a group consisting of the (meth)acrylic acid ester and the vinyl cyanide compound, and the weight of the polyfunctional monomer. In addition, for example, when the shell layer is composed of a copolymer of one or more kinds selected from a group consisting of the (meth)acrylic acid ester and the vinyl cyanide compound, the polyfunctional monomer, and an unsaturated monomer capable of copolymerizing therewith, the degree of crosslinking of the shell layer is the ratio (wt %) of the weight of the polyfunctional monomer to the total of the weight of the one or more kinds selected from a group consisting of the (meth)acrylic acid ester and the vinyl cyanide compound, the weight of the polyfunctional monomer, and the weight of the unsaturated monomer capable of copolymerizing therewith.

Specifically, for example, when the shell layer is composed of a copolymer of 90 wt % of one or more kinds of monomers selected from a group consisting of the (meth) acrylic acid ester and the vinyl cyanide compound, 1.0 wt % of the polyfunctional monomer, and 9 wt % of the unsaturated monomer capable of copolymerizing therewith, the shell layer is a shell layer part of which is crosslinked, and its degree of crosslinking is 1.0%. In addition, for example, when the shell layer is composed of a polymer of 100 wt % of the polyfunctional monomer, the degree of crosslinking of the shell layer is 100%. The degree of crosslinking of the shell layer may be regulated by regulating a ratio among one or more kinds of monomers selected from a group consisting of the (meth)acrylic acid ester and the vinyl cyanide compound, the polyfunctional monomer, and the unsaturated monomer capable of copolymerizing therewith, the monomers forming the copolymer, as described above.

The degree of crosslinking of the shell layer may be 0.26% or more and 100% or less, may be 0.30% or more and 100% or less, or may be 0.50% or more and 100% or less. In addition, the degree of crosslinking of the shell layer may be 0.26% or more and 30.0% or less, may be 0.30% or more and 30% or less, or may be 0.50% or more and 30.0% or less. In addition, the degree of crosslinking of the shell layer may be 0.26% or more and 10.0% or less, may be 0.30% or more and 10% or less, or may be 0.50% or more and 10.0% or less. The degree of crosslinking of the shell layer can be identified through, for example, the analysis of the CS particles by NMR.

When the CS particles each include a shell layer at least part of which is crosslinked (e.g., when the particles each include a shell layer having a degree of crosslinking of 0.26% or more (more specifically, for example, a shell layer having a degree of crosslinking of 0.26% or more and 30.0% or less, or a shell layer having a degree of crosslinking of 0.26% or more and 10.0% or less), when the particles each include a shell layer having a degree of crosslinking of 0.30% or more (more specifically, for example, a shell layer having a degree of crosslinking of 0.30% or more and 30.0% or less, or a shell layer having a degree of crosslinking of 0.30% or more and 10.0% or less), or when the particles each include a shell layer having a degree of crosslinking of 0.50% or more (more specifically, for example, a shell layer having a degree of crosslinking of 0.50% or more and 30.0% or less, or a shell layer having a degree of crosslinking of 0.50% or more and 10.0% or less)), the CS particles may each include 41 wt % or more, 45 wt % or more, 50 wt % or more, 55 wt % or more, 60 wt % or more, 65 wt % or more, 70 wt % or more, 75 wt % or more, 80 wt % or more, or 85 wt % or more of the core layer.

When the CS particles each include any one of the shell layers at least part of each of which is crosslinked and not less than any one of the lower limit values above of the core layer, the CS particles may each include 98 wt % or less, 97 wt % or less, 96 wt % or less, 95 wt % or less, or 94 wt % or less of the core layer, and may each include 84 wt % or less, 80 wt % or less, or 75 wt % or less of the core layer.

The CS particles may each include a shell layer that is not crosslinked. That is, in a case where the CS particles each include the shell layer that is not crosslinked, the CS particles each preferably include 41 wt % or more of the core layer. In this case, the CS particles may each include 45 wt % or more of the core layer, or may each include 50 wt % or more of the core layer.

More specifically, the CS particles each including the shell layer that is not crosslinked each preferably include 41 wt % or more and 98 wt % or less of the core layer. In this case, the particles may each include 45 wt % or more and 98 wt % or less of the core layer, or may each include 50 wt % or more and 98 wt % or less of the core layer. In each of these cases, the amount of the core layer in each of the CS particles may be 97 wt % or less, may be 96 wt % or less, may be 95 wt % or less, or may be 94 wt % or less.

Further, the CS particles each including the shell layer that is not crosslinked each preferably include 41 wt % or more and 84 wt % or less of the core layer (preferably a rubber layer composed of an acrylic rubber). In this case, the CS particles may each include 41 wt % or more and 80 wt % or less of the core layer, or may each include 41 wt % or more and 75 wt % or less of the core layer. In addition, the CS particles may each include 45 wt % or more and 80 wt % or less of the core layer, or may each include 45 wt % or more and 75 wt % or less of the core layer. In addition, the CS particles may each include 50 wt % or more and 80 wt % or less of the core layer, or may each include 50 wt % or more and 75 wt % or less of the core layer.

In addition, the composition of the present invention and the covering material of the present invention may be as described below. The composition of the present invention and the covering material of the present invention each contain: 100 parts by weight of a resin component formed of 58.1 parts by weight or more and 73.9 parts by weight or less of a TPU, and 26.1 parts by weight or more and 41.9 parts by weight or less of CS particles; and 42 parts by weight or more and 87 parts by weight or less of a PE flame retardant. Each of the CS particles is composed of one or more core layers and one or more shell layers. The core layers include an outermost core layer composed of a polymer having a glass transition temperature of less than 40° C. The shell layers include a crosslinked shell layer composed of a copolymer obtained by the polymerization of raw materials including one or more kinds selected from a group consisting of a (meth)acrylic acid ester and a vinyl cyanide compound, and a polyfunctional monomer, the copolymer having a glass transition temperature of 40° C. or more. The CS particles are one or more kinds selected from a group consisting of the following (a) to (d): (a) CS particles each including 50.1 wt % or more and 88.9 wt % or less of the core layers with respect to 100 wt % of the total of the core layers and the shell layers, and having a degree of crosslinking of the crosslinked shell layer of 0.05% or more and 0.42% or less; (b) CS particles each including 50.1 wt % or more and 89.4 wt % or less of the core layers with respect to 100 wt % of the total of the core layers and the shell layers, and having a degree of crosslinking of the crosslinked shell layer of more than 0.42% and 0.45% or less; (c) CS particles each including 50.1 wt % or more and 90.4 wt % or less of the core layers with respect to 100 wt % of the total of the core layers and the shell layers, and having a degree of crosslinking of the crosslinked shell layer of more than 0.45% and 0.50% or less; and (d) CS particles each including 40.1 wt % or more and 90.4 wt % or less of the core layers with respect to 100 wt % of the total of the core layers and the shell layers, and having a degree of crosslinking of the crosslinked shell layer of more than 0.50% and 5.00% or less.

When the CS particles include the (a), the particles may each include 51.0 wt % or more and 87.0 wt % or less of the core layers with respect to 100 wt % of the total of the core layers and the shell layers, and each preferably include 52.0 wt % or more and 85.0 wt % or less of the core layers. In addition, when the CS particles include the (a), the particles may each include 57.1 wt % or more and 88.9 wt % or less of the core layers with respect to 100 wt % of the total of the core layers and the shell layers, and each preferably include 58.0 wt % or more and 87.0 wt % or less of the core layers, and each more preferably include 60.0 wt % or more and 85.0 wt % or less of the core layers.

When the CS particles include the (a), and each include the core layers in an amount in the range of from 50.1 wt % or more to 88.9 wt % or less, in the range of from 51.0 wt % or more to 87.0 wt % or less, in the range of from 52.0 wt % or more to 85.0 wt % or less, in the range of from 57.1 wt % or more to 88.9 wt % or less, in the range of from 58.0 wt % or more to 87.0 wt % or less, or in the range of from 60.0 wt % or more to 85.0 wt % or less with respect to 100 wt % of the total of the core layers and the shell layers, the degree of crosslinking of the crosslinked shell layer may be 0.05% or more and 0.42% or less, or may be 0.05% or more and 0.43% or less.

When the CS particles include the (b), the particles may each include 51.0 wt % or more and 89.3 wt % or less of the core layers with respect to 100 wt % of the total of the core layers and the shell layers, and each preferably include 52.0 wt % or more and 89.0 wt % or less of the core layers. In addition, when the CS particles include the (b), the particles may each include 57.1 wt % or more and 89.4 wt % or less of the core layers with respect to 100 wt % of the total of the core layers and the shell layers, and each preferably include 58.0 wt % or more and 89.3 wt % or less of the core layers, and each more preferably include 60.0 wt % or more and 89.0 wt % or less of the core layers.

When the CS particles include the (b), and each include the core layers in an amount in the range of from 50.1 wt % or more to 89.4 wt % or less, in the range of from 51.0 wt % or more to 89.3 wt % or less, in the range of from 52.0 wt % or more to 89.0 wt % or less, in the range of from 57.1 wt % or more to 89.4 wt % or less, in the range of from 58.0 wt % or more to 89.3 wt % or less, or in the range of from 60.0 wt % or more to 89.0 wt % or less with respect to 100 wt % of the total of the core layers and the shell layers, the degree of crosslinking of the crosslinked shell layer may be more than 0.42% (or 0.42% more) and 0.45% or less, or may be more than 0.43% (or 0.43% more) and 0.47% or less.

When the CS particles include the (c), the particles may each include 51.0 wt % or more and 90.0 wt % or less of the core layers with respect to 100 wt % of the total of the core layers and the shell layers, and each preferably include 52.0 wt % or more and 89.5 wt % or less of the core layers.

When the CS particles include the (c), and each include the core layers in an amount in the range of from 51.0 wt % or more to 90.0 wt % or less, or in the range of from 52.0 wt % or more to 89.5 wt % or less with respect to 100 wt % of the total of the core layers and the shell layers, the degree of crosslinking of the crosslinked shell layer may be more than 0.45% (or 0.45% more) and 0.50% or less, or may be more than 0.47% (or 0.47% or more) and 0.70% or less.

When the CS particles include the (d), the particles may each include 45.0 wt % or more and 90.0 wt % or less of the core layers with respect to 100 wt % of the total of the core layers and the shell layers, and each preferably include 50.0 wt % or more and 89.5 wt % or less of the core layers.

When the CS particles include the (d), and each include the core layers in an amount in the range of from 45.0 wt % or more to 90.0 wt % or less, or from 50.0 wt % or more to 89.5 wt % or less with respect to 100 wt % of the total of the core layers and the shell layers, the degree of crosslinking of the crosslinked shell layer may be more than 0.50% (or 0.50% more) and 5.00% or less, may be more than 0.70% (or 0.70% or more) and 5.00% or less, may be more than 1.50% (or 1.50% or more) and 5.00% or less, or may be more than 1.70% (or 1.70% or more) and 5.00% or less.

Specifically, the CS particles may be one or more kinds selected from a group consisting of the following (a) to (d): (a) CS particles each including 51.0 wt % or more and 87.0 wt % or less of the core layers with respect to 100 wt % of the total of the core layers and the shell layers, and having a degree of crosslinking of the crosslinked shell layer of 0.05% or more and 0.42% or less; (b) CS particles each including 51.0 wt % or more and 89.3 wt % or less of the core layers with respect to 100 wt % of the total of the core layers and the shell layers, and having a degree of crosslinking of the crosslinked shell layer of more than 0.42% and 0.45% or less; (c) CS particles each including 51.0 wt % or more and 90.0 wt % or less of the core layers with respect to 100 wt % of the total of the core layers and the shell layers, and having a degree of crosslinking of the crosslinked shell layer of more than 0.45% and 0.50% or less; and (d) CS particles each including 45.0 wt % or more and 90.0 wt % or less of the core layers with respect to 100 wt % of the total of the core layers and the shell layers, and having a degree of crosslinking of the crosslinked shell layer of more than 0.50% and 5.00% or less.

In addition, the CS particles may be one or more kinds selected from a group consisting of the following (a) to (d): (a) CS particles each including 51.0 wt % or more and 87.0 wt % or less of the core layers with respect to 100 wt % of the total of the core layers and the shell layers, and having a degree of crosslinking of the crosslinked shell layer of 0.05% or more and 0.43% or less; (b) CS particles each including 51.0 wt % or more and 89.3 wt % or less of the core layers with respect to 100 wt % of the total of the core layers and the shell layers, and having a degree of crosslinking of the crosslinked shell layer of more than 0.43% and 0.47% or less; (c) CS particles each including 51.0 wt % or more and 90.0 wt % or less of the core layers with respect to 100 wt % of the total of the core layers and the shell layers, and having a degree of crosslinking of the crosslinked shell layer of more than 0.47% and 0.70% or less; and (d) CS particles each including 45.0 wt % or more and 90.0 wt % or less of the core layers with respect to 100 wt % of the total of the core layers and the shell layers, and having a degree of crosslinking of the crosslinked shell layer of more than 0.70% and 5.00% or less.

In addition, the CS particles may be one or more kinds selected from a group consisting of the following (a) to (d): (a) CS particles each including 52.0 wt % or more and 85.0 wt % or less of the core layers with respect to 100 wt % of the total of the core layers and the shell layers, and having a degree of crosslinking of the crosslinked shell layer of 0.05% or more and 0.42% or less; (b) CS particles each including 52.0 wt % or more and 89.0 wt % or less of the core layers with respect to 100 wt % of the total of the core layers and the shell layers, and having a degree of crosslinking of the crosslinked shell layer of more than 0.42% and 0.45% or less; (c) CS particles each including 52.0 wt % or more and 89.5 wt % or less of the core layers with respect to 100 wt % of the total of the core layers and the shell layers, and having a degree of crosslinking of the crosslinked shell layer of more than 0.45% and 0.50% or less; and (d) CS particles each including 50.0 wt % or more and 89.5 wt % or less of the core layers with respect to 100 wt % of the total of the core layers and the shell layers, and having a degree of crosslinking of the crosslinked shell layer of more than 0.50% and 5.00% or less.

In addition, the CS particles may be one or more kinds selected from a group consisting of the following (a) to (d):

(a) CS particles each including 52.0 wt % or more and 85.0 wt % or less of the core layers with respect to 100 wt % of the total of the core layers and the shell layers, and having a degree of crosslinking of the crosslinked shell layer of 0.05% or more and 0.43% or less; (b) CS particles each including 52.0 wt % or more and 89.0 wt % or less of the core layers with respect to 100 wt % of the total of the core layers and the shell layers, and having a degree of crosslinking of the crosslinked shell layer of more than 0.43% and 0.47% or less; (c) CS particles each including 52.0 wt % or more and 89.5 wt % or less of the core layers with respect to 100 wt % of the total of the core layers and the shell layers, and having a degree of crosslinking of the crosslinked shell layer of more than 0.47% and 0.70% or less; and (d) CS particles each including 50.0 wt % or more and 89.5 wt % or less of the core layers with respect to 100 wt % of the total of the core layers and the shell layers, and having a degree of crosslinking of the crosslinked shell layer of more than 0.70% and 5.00% or less.

In addition, the CS particles may be one or more kinds selected from a group consisting of the following (a) to (d): (a) CS particles each including 57.1 wt % or more and 88.9 wt % or less of the core layers with respect to 100 wt % of the total of the core layers and the shell layers, and having a degree of crosslinking of the crosslinked shell layer of 0.05% or more and 0.42% or less; (b) CS particles each including 57.1 wt % or more and 89.4 wt % or less of the core layers with respect to 100 wt % of the total of the core layers and the shell layers, and having a degree of crosslinking of the crosslinked shell layer of more than 0.42% and 0.45% or less; (c) CS particles each including 50.1 wt % or more and 90.4 wt % or less of the core layers with respect to 100 wt % of the total of the core layers and the shell layers, and having a degree of crosslinking of the crosslinked shell layer of more than 0.45% and 1.50% or less; and (d) CS particles each including 40.1 wt % or more and 90.4 wt % or less of the core layers with respect to 100 wt % of the total of the core layers and the shell layers, and having a degree of crosslinking of the crosslinked shell layer of more than 1.50% and 5.00% or less.

In addition, the CS particles may be one or more kinds selected from a group consisting of the following (a) to (d): (a) CS particles each including 58.0 wt % or more and 87.0 wt % or less of the core layers with respect to 100 wt % of the total of the core layers and the shell layers, and having a degree of crosslinking of the crosslinked shell layer of 0.05% or more and 0.42% or less; (b) CS particles each including 58.0 wt % or more and 89.3 wt % or less of the core layers with respect to 100 wt % of the total of the core layers and the shell layers, and having a degree of crosslinking of the crosslinked shell layer of more than 0.42% and 0.45% or less; (c) CS particles each including 51.0 wt % or more and 90.0 wt % or less of the core layers with respect to 100 wt % of the total of the core layers and the shell layers, and having a degree of crosslinking of the crosslinked shell layer of more than 0.45% and 1.50% or less; and (d) CS particles each including 45.0 wt % or more and 90.0 wt % or less of the core layers with respect to 100 wt % of the total of the core layers and the shell layers, and having a degree of crosslinking of the crosslinked shell layer of more than 1.50% and 5.00% or less.

In addition, the CS particles may be one or more kinds selected from a group consisting of the following (a) to (d): (a) CS particles each including 58.0 wt % or more and 87.0 wt % or less of the core layers with respect to 100 wt % of the total of the core layers and the shell layers, and having a degree of crosslinking of the crosslinked shell layer of 0.05% or more and 0.43% or less; (b) CS particles each including 58.0 wt % or more and 89.3 wt % or less of the core layers with respect to 100 wt % of the total of the core layers and the shell layers, and having a degree of crosslinking of the crosslinked shell layer of more than 0.43% and 0.47% or less; (c) CS particles each including 51.0 wt % or more and 90.0 wt % or less of the core layers with respect to 100 wt % of the total of the core layers and the shell layers, and having a degree of crosslinking of the crosslinked shell layer of more than 0.47% and 1.70% or less; and (d) CS particles each including 45.0 wt % or more and 90.0 wt % or less of the core layers with respect to 100 wt % of the total of the core layers and the shell layers, and having a degree of crosslinking of the crosslinked shell layer of more than 1.70% and 5.00% or less.

In addition, the CS particles may be one or more kinds selected from a group consisting of the following (a) to (d): (a) CS particles each including 60.0 wt % or more and 85.0 wt % or less of the core layers with respect to 100 wt % of the total of the core layers and the shell layers, and having a degree of crosslinking of the crosslinked shell layer of 0.05% or more and 0.42% or less; (b) CS particles each including 60.0 wt % or more and 89.0 wt % or less of the core layers with respect to 100 wt % of the total of the core layers and the shell layers, and having a degree of crosslinking of the crosslinked shell layer of more than 0.42% and 0.45% or less; (c) CS particles each including 52.0 wt % or more and 89.5 wt % or less of the core layers with respect to 100 wt % of the total of the core layers and the shell layers, and having a degree of crosslinking of the crosslinked shell layer of more than 0.45% and 1.50% or less; and (d) CS particles each including 50.0 wt % or more and 89.5 wt % or less of the core layers with respect to 100 wt % of the total of the core layers and the shell layers, and having a degree of crosslinking of the crosslinked shell layer of more than 1.50% and 5.00% or less.

In addition, the CS particles may be one or more kinds selected from a group consisting of the following (a) to (d): (a) CS particles each including 60.0 wt % or more and 85.0 wt % or less of the core layers with respect to 100 wt % of the total of the core layers and the shell layers, and having a degree of crosslinking of the crosslinked shell layer of 0.05% or more and 0.43% or less; (b) CS particles each including 60.0 wt % or more and 89.0 wt % or less of the core layers with respect to 100 wt % of the total of the core layers and the shell layers, and having a degree of crosslinking of the crosslinked shell layer of more than 0.43% and 0.47% or less; (c) CS particles each including 52.0 wt % or more and 89.5 wt % or less of the core layers with respect to 100 wt % of the total of the core layers and the shell layers, and having a degree of crosslinking of the crosslinked shell layer of more than 0.47% and 1.70% or less; and (d) CS particles each including 50.0 wt % or more and 89.5 wt % or less of the core layers with respect to 100 wt % of the total of the core layers and the shell layers, and having a degree of crosslinking of the crosslinked shell layer of more than 1.70% and 5.00% or less.

When the CS particles are one or more kinds selected from a group consisting of the (a) to (d), the CS particles may include at least the (a), may include at least the (b), may include at least the (c), or may include at least the (d). In addition, the CS particles may include the (a) and the (b), and in this case, the particles may further include the (c), may further include the (d), or may further include the (c) and the (d). The CS particles may include the (a) and the (c), and in this case, the particles may further include the (d). The CS particles may include the (a) and the (d). The CS particles may include the (b) and the (c), and in this case, the particles may further include the (d). The CS particles may include the (b) and the (d). The CS particles may include the (c) and the (d).

With regard to each of the CS particles of the (a), the degree of crosslinking of the crosslinked shell layer may be 0.10% or more, and is preferably 0.15% or more, more preferably 0.20% or more, particularly preferably 0.25% or more. Each of those lower limit values for the degree of crosslinking of the (a) is combined with each of the above-mentioned upper limit values for the degree of crosslinking. In addition, with regard to each of the CS particles of the (d), the degree of crosslinking of the crosslinked shell layer is preferably 4.00% or less, more preferably 3.00% or less, particularly preferably 2.00% or less. Each of those upper limit values for the degree of crosslinking of the (d) is combined with each of the above-mentioned lower limit values for the degree of crosslinking.

In addition, in a case where each of the CS particles is composed of one or more core layers and one or more shell layers, the core layers include an outermost core layer composed of a polymer having a glass transition temperature of less than 40° C., the shell layers include a crosslinked shell layer composed of a copolymer obtained by the polymerization of raw materials including one or more kinds selected from a group consisting of a (meth)acrylic acid ester and a vinyl cyanide compound, and a polyfunctional monomer, the copolymer having a glass transition temperature of 40° C. or more, and the CS particles are one or more kinds selected from a group consisting of the (a) to (d) as described above, the composition of the present invention and the covering material of the present invention may each contain: 100 parts by weight of a resin component formed of 59.1 parts by weight or more and 73.9 parts by weight or less of a TPU, and 26.1 parts by weight or more and 40.9 parts by weight or less of the CS particles; and 42 parts by weight or more and 87 parts by weight or less of a PE flame retardant. In this case, the composition of the present invention and the covering material of the present invention each exhibit extremely excellent flame retardancy.

In addition, in this case, the composition of the present invention and the covering material of the present invention each preferably contain: 100 parts by weight of a resin component formed of 59.2 parts by weight or more and 73.7 parts by weight or less of the TPU, and 26.2 parts by weight or more and 40.7 parts by weight or less of the CS particles; and 42 parts by weight or more and 87 parts by weight or less of the PE flame retardant.

Further, the composition of the present invention and the covering material of the present invention each more preferably contain: 100 parts by weight of a resin component formed of 59.5 parts by weight or more and 73.5 parts by weight or less of the TPU, and 26.5 parts by weight or more and 40.5 parts by weight or less of the CS particles; and 43 parts by weight or more and 85 parts by weight or less of the PE flame retardant.

The one or more shell layers in each of the CS particles are not particularly limited as long as the shell layers include a crosslinked shell layer composed of the copolymer having a glass transition temperature of 40° C. or more. That is, when the CS particles each include two or more shell layers, at least one shell layer out of the two or more shell layers only needs to be the crosslinked shell layer. However, it is preferred that the CS particles each include one shell layer, and the one shell layer be the crosslinked shell layer.

In addition, the crosslinked shell layer is preferably an outermost shell layer constituting the outermost layer of each of the CS particles. That is, when the CS particles each include two or more shell layers, the outermost shell layer serving as a shell layer on the outermost side of each of the CS particles in its radial direction out of the two or more shell layers is preferably the crosslinked shell layer. When the CS particles each include one shell layer (the shell layer of each of the CS particles is formed of one shell layer), the one shell layer is the outermost shell layer and is the crosslinked shell layer.

In addition, the copolymer composing the crosslinked shell layer may be a copolymer of one or more kinds selected from a group consisting of a (meth)acrylic acid ester and a vinyl cyanide compound, a polyfunctional monomer, and an unsaturated monomer capable of copolymerizing therewith. That is, in this case, the crosslinked shell layer is composed of a copolymer of one or more kinds selected from a group consisting of the (meth)acrylic acid ester and the vinyl cyanide compound, the polyfunctional monomer, and the unsaturated monomer capable of copolymerizing therewith, the copolymer having a glass transition temperature of 40° C. or more.

The CS particles may each include one or more shell layers each composed of a copolymer obtained by the polymerization of raw materials including one or more kinds selected from a group consisting of a (meth)acrylic acid ester and a vinyl cyanide compound, and a polyfunctional monomer, the copolymer having a glass transition temperature of 40° C. or more. In this case, the CS particles may each include one or more shell layers each composed of a copolymer of one or more kinds selected from a group consisting of the (meth)acrylic acid ester and the vinyl cyanide compound, the polyfunctional monomer, and an unsaturated monomer capable of copolymerizing therewith, the copolymer having a glass transition temperature of 40° C. or more.

In addition, the CS particles may each include one or more shell layers each composed of a polymer (polymer that is not crosslinked) obtained by the polymerization of a raw material including one or more kinds selected from a group consisting of a (meth)acrylic acid ester and a vinyl cyanide compound, and free of a polyfunctional monomer, the polymer having a glass transition temperature of 40° C. or more. In this case, the CS particles may each include one or more shell layers each composed of a copolymer (copolymer that is not crosslinked) of one or more kinds selected from a group consisting of the (meth)acrylic acid ester and the vinyl cyanide compound, and an unsaturated monomer capable of copolymerizing therewith, the copolymer having a glass transition temperature of 40° C. or more.

In addition, the composition of the present invention and the covering material of the present invention may be as described below. The composition of the present invention and the covering material of the present invention each contain: 100 parts by weight of a resin component formed of 58.1 parts by weight or more and 73.9 parts by weight or less of a TPU, and 26.1 parts by weight or more and 41.9 parts by weight or less of CS particles; and 42 parts by weight or more and 87 parts by weight or less of a PE flame retardant. Each of the CS particles is composed of one or more core layers and one or more shell layers, and each include 57.1 wt % or more and 82.0 wt % or less of the core layers with respect to 100 wt % of the total of the core layers and the shell layers. In this case, the composition of the present invention and the covering material of the present invention each exhibit extremely excellent flame retardancy.

In addition, in this case, the CS particles each preferably include 58.0 wt % or more and 82.0 wt % or less of the core layers with respect to 100 wt % of the total of the core layers and the shell layers. Further, in this case, the CS particles each more preferably include 60.0 wt % or more and 82.0 wt % or less of the core layers with respect to 100 wt % of the total of the core layers and the shell layers.

In addition, in a case where the CS particles each include the core layers in an amount in the range of from 57.1 wt % or more to 82.0 wt % or less, or in a range narrower than the above-mentioned range with respect to 100 wt % of the total of the core layers and the shell layers as described above, the CS particles may have a Shore A hardness of 81 or more and 100 or less, the hardness being measured by a method in conformity with JIS K 6253-3:2012 in which: a type A durometer is used as a testing machine; an automatic timer apparatus is not used; a laminate obtained by laminating 6 sheets (30 mm×40 mm) each having a thickness of 1.0 mm or more and 1.5 mm or less is used as a test piece; the test piece is subjected to conditioning at a temperature of 23° C. and a relative humidity of 50% for 24 hours or more, and then a pressure plate is brought into contact with the test piece at a temperature of 23° C. and a relative humidity of 50%; and a measured value 10 seconds after the contact is read.

In this case, the Shore A hardness of the CS particles measured by the method may be 81 or more and 96 or less, may be 82 or more and 96 or less, or may be 85 or more and 93 or less.

In addition, in a case where each of the CS particles is composed of one or more core layers and one or more shell layers, and each include the core layers in an amount in the range of from 57.1 wt % or more to 82.0 wt % or less, or in a range narrower than the above-mentioned range with respect to 100 wt % of the total of the core layers and the shell layers as described above, the one or more shell layers may each be composed of a polymer obtained by the polymerization of a raw material including one or more kinds selected from a group consisting of a (meth)acrylic acid ester and a vinyl cyanide compound, and free of a polyfunctional monomer, the polymer having a glass transition temperature of 40° C. or more. That is, each of the CS particles is composed of one or more core layers and the one or more shell layers that are not crosslinked. In this case, the CS particles each preferably include one or more core layers and one shell layer that is not crosslinked, and each more preferably include one core layer and one shell layer that is not crosslinked.

In addition, in a case where the CS particles each include the core layers in an amount in the range of from 57.1 wt % or more to 82.0 wt % or less, or in a range narrower than the above-mentioned range with respect to 100 wt % of the total of the core layers and the shell layers, and the shell layers are not crosslinked, as described above, the CS particles may have a Shore A hardness of 81 or more and 100 or less, the hardness being measured by a method in conformity with JIS K 6253-3:2012 in which: a type A durometer is used as a testing machine; an automatic timer apparatus is not used; a laminate obtained by laminating 6 sheets (30 mm×40 mm) each having a thickness of 1.0 mm or more and 1.5 mm or less is used as a test piece; the test piece is subjected to conditioning at a temperature of 23° C. and a relative humidity of 50% for 24 hours or more, and then a pressure plate is brought into contact with the test piece at a temperature of 23° C. and a relative humidity of 50%; and a measured value 10 seconds after the contact is read.

Further, in this case, the Shore A hardness of the CS particles measured by the method may be 81 or more and 96 or less, may be 82 or more and 96 or less, may be 85 or more and 93 or less, or may be 85 or more and 90 or less.

In addition, in a case where each of the CS particles is composed of one or more core layers and one or more shell layers, and each include the core layers in an amount in the range of from 57.1 wt % or more to 82.0 wt % or less, or in a range narrower than the above-mentioned range with respect to 100 wt % of the total of the core layers and the shell layers, and the one or more shell layers each composed of a polymer obtained by the polymerization of a raw material including one or more kinds selected from a group consisting of a (meth)acrylic acid ester and a vinyl cyanide compound, and free of a polyfunctional monomer, the polymer having a glass transition temperature of 40° C. or more, as described above, the composition of the present invention and the covering material of the present invention may each contain: 100 parts by weight of a resin component formed of 58.6 parts by weight or more and 73.4 parts by weight or less of a TPU, and 26.6 parts by weight or more and 41.4 parts by weight or less of the CS particles; and 41 parts by weight or more and 87 parts by weight or less of a PE flame retardant. In this case, the composition of the present invention and the covering material of the present invention each exhibit extremely excellent flame retardancy.

In this case, the composition of the present invention and the covering material of the present invention each preferably contain: 100 parts by weight of a resin component formed of 59.0 parts by weight or more and 72.0 parts by weight or less of the TPU, and 28.0 parts by weight or more and 41.0 parts by weight or less of the CS particles; and 41 parts by weight or more and 86 parts by weight or less of the PE flame retardant.

Further, in this case, the composition of the present invention and the covering material of the present invention each more preferably contain: 100 parts by weight of a resin component formed of 60.0 parts by weight or more and 70.0 parts by weight or less of the TPU, and 30.0 parts by weight or more and 40.0 parts by weight or less of the CS particles; and 41 parts by weight or more and 85 parts by weight or less of the PE flame retardant.

In addition, in a case where the composition of the present invention and the covering material of the present invention each contain 100 parts by weight of a resin component formed of a TPU in an amount in the range of from 58.6 parts by weight or more to 73.4 parts by weight or less, or in a range narrower than the above-mentioned range, and CS particles in an amount in the range of from 26.6 parts by weight or more to 41.4 parts by weight or less, or in a range narrower than the above-mentioned range, and a PE flame retardant in an amount in the range of from 41 parts by weight or more to 87 parts by weight or less, or in a range narrower than the above-mentioned range, each of the CS particles is composed of one or more core layers and one or more shell layers, and each include the core layers in an amount in the range of from 57.1 wt % or less to 82.0 wt % or less, or in a range narrower than the above-mentioned range with respect to 100 wt % of the total of the core layers and the shell layers, and the one or more shell layers each composed of a polymer obtained by the polymerization of a raw material including one or more kinds selected from a group consisting of a (meth)acrylic acid ester and a vinyl cyanide compound, and free of a polyfunctional monomer, the polymer having a glass transition temperature of 40° C. or more, the CS particles may have a Shore A hardness of 81 or more and 100 or less, the hardness being measured by a method in conformity with JIS K 6253-3:2012 in which: a type A durometer is used as a testing machine; an automatic timer apparatus is not used; a laminate obtained by laminating 6 sheets (30 mm×40 mm) each having a thickness of 1.0 mm or more and 1.5 mm or less is used as a test piece; the test piece is subjected to conditioning at a temperature of 23° C. and a relative humidity of 50% for 24 hours or more, and then a pressure plate is brought into contact with the test piece at a temperature of 23° C. and a relative humidity of 50%; and a measured value 10 seconds after the contact is read.

Further, in this case, the Shore A hardness of the CS particles measured by the method may be 81 or more and 96 or less, may be 82 or more and 96 or less, may be 85 or more and 93 or less, or may be 85 or more and 90 or less.

In addition, in a case where the one or more shell layers of each of the CS particles are not crosslinked as described above, a polymer composing each of the one or more shell layers may be a copolymer of one or more kinds selected from a group consisting of a (meth)acrylic acid ester and a vinyl cyanide compound, and an unsaturated monomer capable of copolymerizing therewith. That is, in this case, each of the one or more shell layers is composed of a copolymer of one or more kinds selected from a group consisting of the (meth)acrylic acid ester and the vinyl cyanide compound, and the unsaturated monomer capable of copolymerizing therewith, the copolymer having a glass transition temperature of 40° C. or more.

In paragraph 0021 of Patent Literature 2 (JP 2005-015942 A) described above, there is a disclosure of an acrylic soft multilayer structure resin formed of: (A) 5 parts by weight to 30 parts by weight of a hard polymer layer serving as an innermost layer obtained by polymerizing a monomer mixture formed of 80 wt % to 98.99 wt % of methyl methacrylate, 1 wt % to 20 wt % of an acrylic acid alkyl ester having an alkyl group having 1 to 8 carbon atoms, 0.01 wt % to 1 wt % of a polyfunctional grafting agent, and 0 wt % to 0.5 wt % of a polyfunctional crosslinking agent; (B) 20 parts by weight to 45 parts by weight of a hard polymer layer serving as an intermediate layer obtained by polymerizing a monomer mixture formed of 70 wt % to 99.5 wt % of an acrylic acid alkyl ester having an alkyl group having 1 to 8 carbon atoms, 0 wt % to 30 wt % of methyl methacrylate, 0.5 wt % to 5 wt % of a polyfunctional grafting agent, and 0 wt % to 5 wt % of a polyfunctional crosslinking agent; and (C) 50 parts by weight to 75 parts by weight of a hard polymer layer serving as an outermost layer obtained by polymerizing a monomer mixture formed of 90 wt % to 99 wt % of methyl methacrylate and 10 wt % to 1 wt % of an acrylic acid alkyl ester having an alkyl group having 1 to 8 carbon atoms.

In this case, with regard to the components composing the intermediate layer in the (B) of Patent Literature 2 described above, the acrylic acid alkyl ester having the highest glass transition temperature is methyl acrylate and its glass transition temperature is 10° C., while the glass transition temperature of methyl methacrylate is 105° C. Therefore, in a case where 70 parts by weight of methyl acrylate and 30 parts by weight of methyl methacrylate are used in combination, the glass transition temperature of the intermediate layer in the (B) of Patent Literature 2 described above becomes highest. In this case, according to the equation (1), the glass transition temperature is calculated to be 33° C. That is, the intermediate layer in the (B) of Patent Literature 2 described above does not correspond to the crosslinked shell layer in this embodiment.

Meanwhile, with regard to the components composing the outermost layer in the (C) of Patent Literature 2 described above, the glass transition temperature of methyl methacrylate is 105° C., and the glass transition temperature of the acrylic acid alkyl ester having the lowest glass transition temperature is about −110° C. Therefore, when 90 parts by weight of methyl methacrylate and 10 parts by weight of the acrylic acid alkyl ester are used in combination, according to the equation (1), the glass transition temperature of the resultant polymer is around 61° C.

The polymer composing the shell layer is preferably excellent in compatibility with the TPU. Accordingly, the shell layer is preferably composed of a polymer whose solubility parameter (SP) value differs from the SP value of the TPU by 5 or less. The difference between the SP value of the polymer composing the shell layer and the SP value of the TPU is preferably 3 or less, more preferably 2 or less, particularly preferably 1 or less. When the CS particles each include two or more shell layers, a difference between the solubility parameter (SP) value of the entirety of the polymers composing the two or more shell layers and the SP value of the TPU may be 5 or less (preferably 3 or less, more preferably 2 or less, particularly preferably 1 or less).

As described above, the composition of the present invention and the covering material of the present invention each preferably contain 58.1 parts by weight or more and 73.9 parts by weight or less of the TPU, and 26.1 parts by weight or more and 41.9 parts by weight or less of the CS particles so that the total of the parts by weight of the TPU and the parts by weight of the CS particles may be 100 parts by weight. In this case, the composition of the present invention and the covering material of the present invention may each contain 58.5 parts by weight or more and 73.5 parts by weight or less of the TPU, and 26.5 parts by weight or more and 41.5 parts by weight or less of the CS particles so that the total of the parts by weight of the TPU and the parts by weight of the CS particles may be 100 parts by weight. When the composition of the present invention and the covering material of the present invention each contain the TPU and the CS particles at those specific weight ratios, the composition of the present invention and the covering material of the present invention each exhibit particularly excellent flame retardancy.

In addition, the composition of the present invention and the covering material of the present invention each preferably contain the TPU, and 35.2 parts by weight or more and 72.3 parts by weight or less of a flame retardant formed of the CS particles with respect to 100 parts by weight of the TPU. In this case, the composition of the present invention and the covering material of the present invention may each contain the TPU, and 36.1 parts by weight or more and 70.9 parts by weight or less of the flame retardant formed of the CS particles with respect to 100 parts by weight of the TPU. When the composition of the present invention and the covering material of the present invention each contain the TPU and the CS particles at those specific weight ratios, the composition of the present invention and the covering material of the present invention each exhibit particularly excellent flame retardancy.

The composition of the present invention and the covering material of the present invention each contain the PE flame retardant as a non-halogen (halogen-free) flame retardant. The PE flame retardant is a phosphoric acid ester exhibiting flame retardancy in each of a thermoplastic polyurethane resin composition and a conductor covering material each containing the TPU.

That is, the PE flame retardant is, for example, the following phosphoric acid ester: in such flame retardancy test as described above for the CS particles, the PE flame retardant reduces the flame-out time of a test piece of each of a thermoplastic polyurethane resin composition and a conductor covering material each containing the TPU and the PE flame retardant so that the flame-out time may be shorter than the flame-out time of a test piece of each of a thermoplastic polyurethane resin composition and a conductor covering material each of which contains the TPU and is free of the PE flame retardant.

The PE flame retardant may be a condensed phosphoric acid ester. In addition, the PE flame retardant may be a phosphoric acid ester containing a cyclic structure in a molecule thereof. In this case, the PE flame retardant may be a condensed phosphoric acid ester containing a cyclic structure in a molecule thereof. In each of these cases, the cyclic structure may be a benzene ring and/or a heterocycle (e.g., a heterocycle containing one or more kinds selected from a group consisting of a phosphorus atom, an oxygen atom, and a nitrogen atom, or a heterocycle containing a phosphorus atom and/or an oxygen atom).

The PE flame retardant is preferably excellent in compatibility with the TPU. Accordingly, the PE flame retardant is preferably a phosphoric acid ester whose solubility parameter (SP) value differs from the SP value of the TPU by 5 or less. The difference between the SP value of the PE flame retardant and the SP value of the TPU is preferably 3 or less, more preferably 2 or less, particularly preferably 1 or less.

As described above, the composition of the present invention and the covering material of the present invention each preferably contain: 100 parts by weight of a resin component formed of 58.1 parts by weight or more and 73.9 parts by weight or less of the TPU, and 26.1 parts by weight or more and 41.9 parts by weight or less of the CS particles; and 42 parts by weight or more and 87 parts by weight or less of the PE flame retardant. In this case, the composition of the present invention and the covering material of the present invention may each contain: 100 parts by weight of a resin component formed of 58.5 parts by weight or more and 73.5 parts by weight or less of the TPU, and 26.5 parts by weight or more and 41.5 parts by weight or less of the CS particles; and 43 parts by weight or more and 85 parts by weight or less of the PE flame retardant. When the composition of the present invention and the covering material of the present invention each contain the TPU, the CS particles, and the PE flame retardant at those specific weight ratios, the composition of the present invention and the covering material of the present invention each exhibit particularly excellent flame retardancy.

In addition, the composition of the present invention and the covering material of the present invention each preferably contain: the TPU; 35.2 parts by weight or more and 72.3 parts by weight or less of the flame retardant formed of the CS particles with respect to 100 parts by weight of the TPU; and 42 parts by weight or more and 87 parts by weight or less of the PE flame retardant with respect to 100 parts by weight of the total of the TPU and the CS particles. In this case, the composition of the present invention and the covering material of the present invention may each contain: the TPU; 36.1 parts by weight or more and 70.9 parts by weight or less of the flame retardant formed of the CS particles with respect to 100 parts by weight of the TPU; and 43 parts by weight or more and 85 parts by weight or less of the PE flame retardant with respect to 100 parts by weight of the total of the TPU and the CS particles. When the composition of the present invention and the covering material of the present invention each contain the TPU, the CS particles, and the PE flame retardant at those specific weight ratios, the composition of the present invention and the covering material of the present invention each exhibit particularly excellent flame retardancy.

In addition, the composition of the present invention and the covering material of the present invention each preferably contain 21.9 parts by weight or more and 40.7 parts by weight or less of the flame retardant formed of the CS particles with respect to 100 parts by weight of the total of the TPU and the PE flame retardant. In this case, the composition of the present invention and the covering material of the present invention each preferably contain 22.4 parts by weight or more and 40.1 parts by weight or less of the flame retardant formed of the CS particles with respect to 100 parts by weight of the total of the TPU and the PE flame retardant. The composition of the present invention and the covering material of the present invention each also preferably contain: the TPU; 63.2 parts by weight or more and 135.3 parts by weight or less of the PE flame retardant with respect to 100 parts by weight of the TPU; and 23.0 parts by weight or more and 40.7 parts by weight or less of the flame retardant formed of the CS particles with respect to 100 parts by weight of the total of the TPU and the PE flame retardant. In this case, the composition of the present invention and the covering material of the present invention may each contain: the TPU; 66.2 parts by weight or more and 130.8 parts by weight or less of the PE flame retardant with respect to 100 parts by weight of the TPU; and 30.6 parts by weight or more and 40.1 parts by weight or less of the flame retardant formed of the CS particles with respect to 100 parts by weight of the total of the TPU and the PE flame retardant. In addition, the composition of the present invention and the covering material of the present invention may each contain: the TPU; 64.3 parts by weight or more and 76.9 parts by weight or less of the PE flame retardant with respect to 100 parts by weight of the TPU; and 26.1 parts by weight or more and 40.1 parts by weight or less of the flame retardant formed of the CS particles with respect to 100 parts by weight of the total of the TPU and the PE flame retardant. When the composition of the present invention and the covering material of the present invention each contain the TPU, the PE flame retardant, and the CS particles at those specific weight ratios, the composition of the present invention and the covering material of the present invention each exhibit particularly excellent flame retardancy.

When the composition of the present invention and the covering material of the present invention each contain the TPU, the PE flame retardant, and the CS particles at such specific weight ratios as described above, the composition of the present invention and the covering material of the present invention may each contain, for example, a polyester-based TPU (specifically, for example, a polyester-based TPU having a flow starting point of 155° C. or more, 160° C. or more, preferably 170° C. or more, 175° C. or more, or 180° C. or more, and more specifically, an adipate-based TPU having a flow starting point of 155° C. or more, 160° C. or more, preferably 170° C. or more, 175° C. or more, or 180° C. or more), and CS particles each including a shell layer at least part of which is crosslinked (specifically, for example, a shell layer having a degree of crosslinking of preferably 0.26% or more (e.g., 0.26% or more and 30.0% or less, or 0.26% or more and 10.0% or less), a shell layer having a degree of crosslinking of 0.30% or more (e.g., 0.30% or more and 30.0% or less, or 0.30% or more and 10.0% or less), or a shell layer having a degree of crosslinking of 0.50% or more (e.g., 0.50% or more and 30.0% or less, or 0.50% or more and 10.0% or less)).

In addition, when the composition of the present invention and the covering material of the present invention each contain the specific TPU, the PE flame retardant, and the CS particles each including any one of the shell layers at least part of each of which is crosslinked at such specific weight ratios as described above, the CS particles may each include 41 wt % or more, 45 wt % or more, or 50 wt % or more of a core layer. In addition, in each of these cases, the CS particles may each include 98 wt % or less, 97 wt % or less, 96 wt % or less, 95 wt % or less, or 94 wt % or less of the core layer, and may each include 84 wt % or less, 80 wt % or less, or 75 wt % or less of the core layer.

For example, each of the composition of the present invention and the covering material of the present invention may be free of a radical polymerizable compound, may be free of a radical polymerization initiator, or may be free of a curing agent. In addition, the composition of the present invention may not be a curable composition. In addition, the resin raw material to be used in the manufacture of the covering material of the present invention may not be a curable resin raw material.

A manufacturing method for the composition of the present invention includes mixing the TPU, the PE flame retardant, and the CS particles. That is, the composition of the present invention is manufactured as a mixture obtained by mixing the TPU, the PE flame retardant, and the CS particle flame retardant.

In addition, the manufacturing method for the composition of the present invention preferably includes, for example, mixing: 100 parts by weight of a resin component formed of 58.1 parts by weight or more and 73.9 parts by weight or less (e.g., 58.5 parts by weight or more and 73.5 parts by weight or less) of the TPU, and 26.1 parts by weight or more and 41.9 parts by weight or less (e.g., 26.5 parts by weight or more and 41.5 parts by weight or less) of the CS particles; and 42 parts by weight or more and 87 parts by weight or less (e.g., 43 parts by weight or more and 85 parts by weight or less) of the PE flame retardant.

In addition, the manufacturing method for the composition of the present invention preferably includes mixing: the TPU; 35.2 parts by weight or more and 72.3 parts by weight or less (e.g., 36.1 parts by weight or more and 70.9 parts by weight or less) of the flame retardant formed of the CS particles with respect to 100 parts by weight of the TPU; and 42 parts by weight or more and 87 parts by weight or less (e.g., 43 parts by weight or more and 85 parts by weight or less) of the PE flame retardant with respect to 100 parts by weight of the total of the TPU and the CS particles.

In addition, the manufacturing method for the composition of the present invention preferably includes mixing 21.9 parts by weight or more and 40.7 parts by weight or less (e.g., 22.4 parts by weight or more and 40.1 parts by weight or less) of the flame retardant formed of the CS particles with respect to 100 parts by weight of the total of the TPU and the PE flame retardant. The manufacturing method for the composition of the present invention also preferably includes mixing: the TPU; 63.2 parts by weight or more and 135.3 parts by weight or less (e.g., 66.2 parts by weight or more and 130.8 parts by weight or less) of the PE flame retardant with respect to 100 parts by weight of the TPU; and 23.0 parts by weight or more and 40.7 parts by weight or less (e.g., 30.6 parts by weight or more and 40.1 parts by weight or less) of the flame retardant formed of the CS particles with respect to 100 parts by weight of the total of the TPU and the PE flame retardant. The manufacturing method for the composition of the present invention also preferably includes mixing: the TPU; 64.3 parts by weight or more and 76.9 parts by weight or less of the PE flame retardant with respect to 100 parts by weight of the TPU; and 26.1 parts by weight or more and 40.1 parts by weight or less of the flame retardant formed of the CS particles with respect to 100 parts by weight of the total of the TPU and the PE flame retardant.

The mixing in the manufacturing method for the composition of the present invention is performed with a mixing apparatus, such as a Henschel mixer, a ribbon blender, a tumbler, a mazelar, a Banbury mixer, a kneader, an extruder, or a mixing roll.

A manufacturing method for the covering material of the present invention includes molding a resin raw material containing the TPU, the PE flame retardant, and the CS particles. The manufacturing method for the covering material of the present invention preferably includes molding a resin raw material containing: 100 parts by weight of a resin component formed of 58.1 parts by weight or more and 73.9 parts by weight or less (e.g., 58.5 parts by weight or more and 73.5 parts by weight or less) of the TPU, and 26.1 parts by weight or more and 41.9 parts by weight or less (e.g., 26.5 parts by weight or more and 41.5 parts by weight or less) of the CS particles; and 42 parts by weight or more and 87 parts by weight or less (e.g., 43 parts by weight or more and 85 parts by weight or less) of the PE flame retardant.

In addition, the manufacturing method for the covering material of the present invention preferably includes molding a resin raw material containing: the TPU; 35.2 parts by weight or more and 72.3 parts by weight or less (e.g., 36.1 parts by weight or more and 70.9 parts by weight or less) of the flame retardant formed of the CS particles with respect to 100 parts by weight of the TPU; and 42 parts by weight or more and 87 parts by weight or less (e.g., 43 parts by weight or more and 85 parts by weight or less) of the PE flame retardant with respect to 100 parts by weight of the total of the TPU and the CS particles.

In addition, the manufacturing method for the covering material of the present invention preferably includes molding a resin raw material containing 21.9 parts by weight or more and 40.7 parts by weight or less (e.g., 22.4 parts by weight or more and 40.1 parts by weight or less) of the flame retardant formed of the CS particles with respect to 100 parts by weight of the total of the TPU and the PE flame retardant. The manufacturing method for the covering material of the present invention also preferably includes molding a resin raw material containing: the TPU; 63.2 parts by weight or more and 135.3 parts by weight or less (e.g., 66.2 parts by weight or more and 130.8 parts by weight or less) of the PE flame retardant with respect to 100 parts by weight of the TPU; and 23.0 parts by weight or more and 40.7 parts by weight or less (e.g., 30.6 parts by weight or more and 40.1 parts by weight or less) of the flame retardant formed of the CS particles with respect to 100 parts by weight of the total of the TPU and the PE flame retardant. The manufacturing method for the covering material of the present invention also preferably includes molding a resin raw material containing: the TPU; 64.3 parts by weight or more and 76.9 parts by weight or less of the PE flame retardant with respect to 100 parts by weight of the TPU; and 26.1 parts by weight or more and 40.1 parts by weight or less of the flame retardant formed of the CS particles with respect to 100 parts by weight of the total of the TPU and the PE flame retardant.

For example, injection molding, extrusion molding, blow molding, roll molding, or press molding is used in the molding in the manufacturing method for the covering material of the present invention. The shape of the covering material of the present invention is not particularly limited, and is, for example, a sheet shape (including, for example, a sheet, a film, and a tape) or a tubular shape.

Specifically, for example, the covering material of the present invention covering a conductor may be manufactured by: extruding the resin raw material melted by heating from an extruder to manufacture a film-shaped covering material; and then covering the conductor with the film-shaped covering material (e.g., winding the film-shaped covering material around a wire). In addition, for example, the covering material of the present invention covering a conductor may be manufactured by extruding the resin raw material melted by heating from an extruder to the outer periphery of the conductor.

The composition of the present invention has excellent flame retardancy. Accordingly, the composition of the present invention is preferably applied to an application where excellent flame retardancy is required, and is particularly preferably used in an application where a high degree of flame retardancy is required.

The covering material of the present invention has excellent flame retardancy. That is, in, for example, the flame retardancy test described above for the CS particles, the covering material of the present invention may be as follows: the time period after the burner flame has been brought into contact with the test piece of the covering material of the present invention for the first time (first flame-out time) is 15 seconds or less.

Next, specific examples according to the embodiments of the present invention are described.

Example 1

[Manufacture of Thermoplastic Polyurethane Resin Composition (Resin Raw Material)]

An adipate-based TPU having a flow starting point of 180° C. was used as a TPU. Trixylenyl phosphate was used as a phosphoric acid ester-based flame retardant. Core-shell rubber particles (having a volume-average particle diameter of primary particles of 187 nm) each including 89 wt % of a core layer composed of an acrylic rubber and 11 wt % of a shell layer composed of an acrylic copolymer having a degree of crosslinking of 0.50% were used as CS particles. That is, particles each of which is composed of one core layer and one shell layer were used as the CS particles.

In the manufacture of the CS particles, first, a latex of acrylic rubber particles composing the core layers was manufactured. That is, 200 parts by weight of deionized water and 0.02 part by weight of a sodium polyoxyethylene alkyl ether phosphate serving as such an amount that a target value for a number-average particle diameter was obtained were loaded into a vessel made of glass having a temperature gauge, a stirring machine, a nitrogen inlet, and an apparatus for adding a monomer and an emulsifying agent, and the temperature of the mixture was increased to 40° C. while the mixture was stirred in a stream of nitrogen. Next, a mixture of 4.975 parts by weight of butylacrylate, 0.025 part by weight of allyl methacrylate, and 0.02 part by weight of cumene hydroperoxide was loaded into the vessel, and 10 minutes after that, 0.006 part by weight of disodium ethylenediamine tetraacetate, 0.001 part by weight of ferrous sulfate heptahydrate salt, and 0.2 part by weight of sodium formaldehyde sulfoxylate were loaded into the vessel. After the contents had been stirred for 60 minutes, 0.1 part by weight of a sodium polyoxyethylene alkyl ether phosphate was loaded into the resultant. After the contents had been stirred for 10 minutes, a monomer mixture formed of 94.525 parts by weight of butyl acrylate, 0.475 part by weight of allyl methacrylate, and 0.2 part by weight of cumene hydroperoxide was dropped to the resultant over 360 minutes. In addition, together with the addition of the monomer mixture, 1.0 part by weight of a sodium polyoxyethylene alkyl ether phosphate was continuously added to the vessel over 360 minutes. After the completion of the addition of the monomer mixture, stirring was continued until a conversion ratio exceeded 98 wt %. Thus, a rubber latex of acrylic rubber particles each having a glass transition temperature of −54° C. was obtained.

Next, the shell layer was formed. That is, after the manufacture of the above-mentioned rubber latex, a temperature was adjusted to 50° C., and a mixture containing 11.68 parts by weight of methyl methacrylate, 0.618 part by weight of butyl acrylate, 0.062 part by weight of allyl methacrylate, and 0.006175 part by weight of cumene hydroperoxide was continuously added in an amount of 25 parts by weight per 1 hour to the latex. After the completion of the addition, 0.1 part by weight of cumene hydroperoxide was added to the resultant, and stirring was continued until a polymerization conversion ratio became 98% or more, to thereby complete polymerization. Thus, a latex of core-shell rubber particles each including a crosslinked shell layer composed of a copolymer obtained by the polymerization of raw materials formed of 0.50 wt % of allyl methacrylate, 5.00 wt % of butyl acrylate, and the residual of methyl methacrylate, the copolymer having a glass transition temperature of 91.6° C., was obtained.

Further, the core-shell rubber particle latex was sprayed by using a swirl flow type cone nozzle (nozzle diameter: 0.6 mm) serving as one kind of pressure nozzle at a spray pressure of 3.7 kg/cm$^2$ in a cylindrical apparatus having a height from the liquid surface of a column bottom portion of 10 m and a diameter of 60 cm so as to become droplets having a volume-average droplet diameter of about 200 μm. Simultaneously therewith, an aqueous solution of calcium chloride having a concentration of 35 wt % was sprayed at a droplet diameter of from 0.1 μm to 10 μm while being mixed with air in a two-fluid nozzle so that a calcium chloride solid content became from 5 parts by weight to 15 parts by weight with respect to 100 parts by weight of a core-shell rubber particle solid content. The latex droplets that had fallen in the column were loaded into a receiving tank in the column bottom portion, and the droplets were recovered.

An aqueous solution of potassium palmitate having a concentration of 5 wt % was added to the resultant core-shell rubber particle slurry so that a potassium palmitate solid content became 1 part by weight with respect to 100 parts by weight of a core-shell rubber particle solid content. The resultant was thermally treated and then dehydrated to provide a dehydrated powder. After that, 1,000 parts by weight of deionized water and the dehydrated powder were mixed, and the mixture was stirred for 10 minutes. After that, a dehydration operation was repeated twice, and then the resultant was dried in a stream of nitrogen at 50° C. to provide a core-shell rubber particle powder.

Then, the TPU, the PE flame retardant, and the CS particles were mixed with a mixing roll (temperature: from 170° C. to 180° C.) at 19 different blending ratios to manufacture, as mixtures thereof, 19 kinds of thermoplastic polyurethane resin compositions (resin raw materials) different from one another in composition.

[Manufacture of Conductor Covering Material]

Conductor covering materials were manufactured by molding the thermoplastic polyurethane resin compositions (resin raw materials) obtained as described above. That is, 19 kinds of sheet-shaped conductor covering materials different from one another in composition were manufactured by molding roll sheets of melted and kneaded resin raw materials through press molding (at 175° C. for 5 minutes under a pressure of 200 MPa).

[Flame Retardancy Test]

The conductor covering materials (test pieces of the thermoplastic polyurethane resin compositions) manufactured as described above were each subjected to a flame retardancy test as described below. That is, the flame retardancy test was performed as described below by using a test piece (measuring 125 mm by 13 mm by 3 mm), which was produced by punching each of sheets of the conductor covering materials (sheets manufactured from the thermoplastic polyurethane resin compositions) with a punching blade, and an HVUL testing machine (manufactured by Atlas) serving as an UL burning testing machine. (1) First, the test piece was vertically suspended by fixing the upper end of the test piece to a clamp so that one end of the test piece in its longitudinal direction was on an upper side, and the other end thereof was on a lower side. (2) Next, a burner flame having a length of 20 mm was prepared, and the upper portion of the burner flame having a length of 10 mm was brought into contact with the central portion of the lower end of the test piece for 10 seconds. (3) After that, a time period from the time point when the burner flame was isolated from the test piece to the time point when the flame of the test piece disappeared (flame-out time) was measured. In addition, at the time of the measurement of the flame-out time, the presence or absence of the occurrence of the dripping of the test piece was also observed. When the test piece did not burn at all after the isolation of the burner flame from the test piece, the flame-out time was defined as zero seconds. In addition, the burner flame was brought into contact with the test piece after the measurement of the first flame-out time (test piece whose flame had disappeared) again according to the foregoing procedure, and a flame-out time was similarly measured and the presence or absence of the occurrence of the dripping was similarly observed. The result was defined as a second measurement result. Such flame retardancy test was performed for each test piece twice.

[Result]

The formulation (parts by weight of the TPU, the PE flame retardant, and the CS particles), and results of the flame retardancy tests, of each of Example 1A-1 to Example 1A-19 are shown in FIG. 5A. In addition, the parts by weight of the CS particles with respect to 100 parts by weight of the total of the TPU and the PE flame retardant, and results of the flame retardancy tests, of each of Example 1B-1 to Example 1B-19 are shown in FIG. 5B. In FIG. 5B, Example 1B-1 to Example 1B-19 correspond to Example 1A-1 to Example 1A-19 of FIG. 5A, respectively, and the parts by weight of the CS particles with respect to 100 parts by weight of the total of the TPU and the PE flame retardant is a value calculated from the parts by weight of the TPU, the PE flame retardant, and the CS particles shown in FIG. 5A.

A flame-out time shown in the "FIRST" of the column "FLAME RETARDANCY TEST" of each of FIG. 5A and FIG. 5B is a flame-out time after the burner flame has been brought into contact with a test piece for the first time in the flame retardancy test. In addition, a flame-out time shown in the "SECOND" of the column "FLAME RETARDANCY TEST" is a flame-out time after the burner flame has been brought into contact with the test piece after the measurement of the first flame-out time (test piece whose flame has disappeared) again. In addition, in the column "FLAME-OUT TIME (SEC)", the symbol "DR" means that dripping occurred, the symbol "BO" means that a burnout occurred, and the symbol "-" means that the measurement could not be performed. In addition, a result obtained as follows is shown in the column "RANK": a case where a flame-out time is from 0 seconds to 15 seconds is ranked as a rank "A", a case where the flame-out time is from 16 seconds to 40 seconds is ranked as a rank "B", a case where the flame-out time is from 41 seconds to 80 seconds is ranked as a rank "C", a case where the flame-out time is 81 seconds or more is ranked as a rank "D", and a case where dripping or a burnout occurs is ranked as a rank "E". When the first flame-out time is ranked as "A" and the second flame-out time is ranked as "A", "B", or "C", it is said that extremely excellent flame retardancy is observed. That is, when a thermoplastic polyurethane resin molded body, such as a conductor covering material, catches fire, as long as the fire disappears immediately after the molded body has caught the fire for the first time, a situation where the fire spreads thereafter to increase damage is effectively avoided. Therefore, it is extremely important that a time period from the time point when the molded body catches fire for the first time to the time point when the fire disappears is extremely short, i.e., the first flame-out time in the flame retardancy test is so short as to correspond to the rank A.

In each of Example 1A-1 of FIG. 5A and Example 1B-1 of FIG. 5B, dripping in which part of the test piece melted to fall while burning occurred. In each of Example 1A-2 to Example 1A-4 of FIG. 5A and Example 1B-2 to Example 1B-4 of FIG. 5B, the test piece burned out in the second test. In addition, in each of Example 1A-16 to Example 1A-19 of FIG. 5A and Example 1B-16 to Example 1B-19 of FIG. 5B, the test piece burned out in the first test.

Meanwhile, in each of Example 1A-5 to Example 1A-15 of FIG. 5A and Example 1B-5 to Example 1B-15 of FIG. 5B in which the thermoplastic polyurethane resin composition and the conductor covering material each contained 58.5 parts by weight or more and 73.5 parts by weight or less of the TPU, and 26.5 parts by weight or more and 41.5 parts by weight or less of the CS particles so that the total of the parts by weight of the TPU and the parts by weight of the CS particles became 100 parts by weight (the thermoplastic polyurethane resin composition and the conductor covering material each contained 22.4 parts by weight or more and 40.1 parts by weight or less of the CS particles with respect to 100 parts by weight of the total of the TPU and the PE flame retardant), the flame-out time in the first test was as extremely short as from 0 seconds to 6 seconds, and the test piece did not burn out even in the second test.

That is, when a thermoplastic polyurethane resin composition and a conductor covering material each contained the TPU, the CS particles, and the PE flame retardant at such specific blending ratios as those in each of Example 1A-5 to Example 1A-15 of FIG. 5A and Example 1B-5 to Example 1B-15 of FIG. 5B, the thermoplastic polyurethane resin composition and the conductor covering material each exhibited extremely high flame retardancy.

Still further, when a thermoplastic polyurethane resin composition and a conductor covering material each contained the TPU, the CS particles, and the PE flame retardant at further limited blending ratios in each of Example 1A-5 to Example 1A-13 of FIG. 5A and Example 1B-5 to Example 1B-13 of FIG. 5B, the first flame-out time was ranked as "A" and the second flame-out time was ranked as "C", and hence the thermoplastic polyurethane resin composition and the conductor covering material each exhibited higher and extremely excellent flame retardancy.

Example 2

[Manufacture of Thermoplastic Polyurethane Resin Composition (Resin Raw Material)]

16 Kinds of thermoplastic polyurethane resin compositions (resin raw materials) were manufactured in the same manner as in Example 1 described above while the blending amount of the PE flame retardant was mainly changed.

[Manufacture of Conductor Covering Material]

16 Kinds of conductor covering materials were manufactured in the same manner as in Example 1 described above.

[Flame Retardancy Test]

The conductor covering materials (test pieces of the thermoplastic polyurethane resin compositions) were each subjected to a flame retardancy test in the same manner as in Example 1 described above.

[Result]

As in FIG. 5A described above, the formulation of the conductor covering material, and results of the flame retardancy tests, of each of Example 2-1 to Example 2-17 are shown in FIG. 6. The results of Example 1A-9 described above in which 45 parts by weight of the PE flame retardant was blended with respect to 100 parts by weight of the resin component (total of the TPU and the CS particles) are shown as Example 2-8 in FIG. 6.

In each of Example 2-1 to Example 2-4, the test piece burned out in the first test. In each of Example 2-5 and Example 2-6, the test piece burned out in the second test. In addition, in each of Example 2-16 and Example 2-17 in which 88 parts by weight or more of the PE flame retardant was blended with respect to 100 parts by weight of the resin component, kneading could not be performed and hence a conductor covering material (test piece of a thermoplastic polyurethane resin composition) could not be manufactured.

Meanwhile, in each of Example 2-7 to Example 2-15 in which the thermoplastic polyurethane resin composition and the conductor covering material each contained 43 parts by weight or more and 85 parts by weight or less of the PE flame retardant with respect to 100 parts by weight of the resin component formed of the TPU and the CS particles (the thermoplastic polyurethane resin composition and the conductor covering material each contained 66.2 parts by weight or more and 130.8 parts by weight or less of the PE flame retardant with respect to 100 parts by weight of the TPU), the flame-out time in the first test was as extremely short as from 0 seconds to 2 seconds, and the test piece did not burn out even in the second test.

That is, when a thermoplastic polyurethane resin composition and a conductor covering material each contained the TPU, the CS particles, and the PE flame retardant at such specific blending ratios as those in each of Example 2-7 to Example 2-15, the thermoplastic polyurethane resin composition and the conductor covering material each exhibited extremely high flame retardancy.

Example 3

[Manufacture of Thermoplastic Polyurethane Resin Composition (Resin Raw Material)]

An adipate-based TPU having a flow starting point of 180° C. was used as a TPU. Trixylenyl phosphate was used as a phosphoric acid ester-based flame retardant. 10 Kinds of core-shell rubber particles (each having a volume-average particle diameter of primary particles of from 181 nm to 188 nm) including a core layer composed of an acrylic rubber and a shell layer composed of an acrylic copolymer that was not crosslinked at different weight ratios were used as CS particles. That is, particles each of which is composed of one core layer and one shell layer were used as the CS particles.

The acrylic copolymer that was not crosslinked composing the shell layer of each of the CS particles was formed by the copolymerization of methyl methacrylate and butyl acrylate in the same manner as in Example 1 described above except that allyl methacrylate was not used. In addition, when the ratio (wt %) of the core layer in each of the CS particles was changed, the composition ratio of the copolymer composing the shell layer of each of the CS particles was maintained. That is, for example, when CS particles each including 85 wt % of a core layer and 15 wt % of a shell layer are manufactured, the amount of the shell layer is 17.65 parts by weight (=15×100/85) with respect to 100 parts by weight of the core layer. In this example, the degree of crosslinking of the shell layer was 0%, and hence the amount of allyl methacrylate was set to 0 parts by weight (=17.65 parts by weight×0 wt %), the amount of butyl acrylate was set to 0.883 part by weight (=17.65 parts by weight×5 wt %), and the amount of methyl methacrylate was set to the balance, i.e., 16.767 parts by weight (=17.65 parts by weight-0.883 part by weight). Then, 14 kinds of thermoplastic polyurethane resin compositions (resin raw materials) were manufactured in the same manner as in Example 1 described above.

[Manufacture of Conductor Covering Material]

14 Kinds of conductor covering materials were manufactured in the same manner as in Example 1 described above.

[Measurement of Shore a Hardness of CS Particles]

In addition, the Shore A hardness of each of the used CS particles was measured. That is, the Shore A hardness of a test piece including a single kind of CS particles was measured by a method in conformity with JIS K 6253-3: 2012 (Rubber, vulcanized or thermoplastic-Determination of hardness-Part 3: Durometer method) under the following conditions. A type A durometer (manufactured by Kobunshi Keiki Co., Ltd., Asker Rubber Hardness Meter Type A, Constant-pressure Loader Type CL-150L (load: 1.0 kg)) was used as a testing machine. An automatic timer apparatus was not used. A laminate obtained by laminating 6 sheets (30 mm×40 mm) (conductor covering materials) each having a thickness of 1.0 mm or more and 1.5 mm or less was used as a test piece. Before the measurement, the test piece was subjected to conditioning at a temperature of 23° C. and a relative humidity of 50% for 24 hours or more. After that, the measurement of the Shore A hardness of the test piece was performed by: bringing a pressure plate into contact with the test piece at a temperature of 23° C. and a relative humidity of 50%; and reading a measured value 10 seconds after the contact. The measurement was performed while the tip of an indenter point was placed at a position distant from an end of the test piece by 12.0 mm or more. In addition, the number of points to be subjected to the measurement was set to five, and the median of the five measured values (third highest value out of the five measured values) was adopted as a value for the Shore A hardness.

[Flame Retardancy Test]

The conductor covering materials (test pieces of the thermoplastic polyurethane resin compositions) were each subjected to a flame retardancy test in the same manner as in Example 1 described above.

[Result]

As in FIG. 5A described above, the formulation of each of the thermoplastic polyurethane resin composition and the conductor covering material, and results of the flame retardancy tests, of each of Example 3-1 to Example 3-14 are shown in FIG. 7. In the column "FORMULATION" of FIG.

7, a number attached to the right side of the symbol "CS-ACR" represents the wt % of the core layer of each of CS particles. That is, for example, the symbol "CS-ACR89.0" represents CS particles each including 89.0 wt % of a core layer.

In Example 3-1 in which the CS particles each including 99.0 wt % of the core layer were used, the test piece burned out in the first test. In addition, in Example 3-14 in which the CS particles each including 40.0 wt % of the core layer were used, the dripping of the test piece occurred in the second test.

Meanwhile, in each of Example 3-2 to Example 3-13 in which the thermoplastic polyurethane resin composition and the conductor covering material each contained CS particles each including 50.0 wt % to 94.0 wt % of a core layer, the test piece did not burn out.

That is, when a thermoplastic polyurethane resin composition and a conductor covering material each contained CS particles each including 50.0 wt % to 94.0 wt % of a core layer, the thermoplastic polyurethane resin composition and the conductor covering material each exhibited high flame retardancy.

Further, in each of Example 3-7 to Example 3-12 in which the thermoplastic polyurethane resin composition and the conductor covering material each contained CS particles each including 50.0 wt % to 82.0 wt % of a core layer, the flame-out time in the first test was as extremely short as from 0 seconds to 1 second, and the test piece did not burn out even in the second test.

That is, when a thermoplastic polyurethane resin composition and a conductor covering material each contained CS particles each including 50.0 wt % to 82.0 wt % of a core layer, the thermoplastic polyurethane resin composition and the conductor covering material each exhibited extremely high flame retardancy.

Still further, in each of Example 3-7 to Example 3-10 in which the thermoplastic polyurethane resin composition and the conductor covering material each contained CS particles each including 60.0 wt % to 82.0 wt % of a core layer, the first flame-out time was ranked as "A" and the second flame-out time was ranked as "C", and hence the thermoplastic polyurethane resin composition and the conductor covering material each exhibited higher and extremely excellent flame retardancy. The Shore A hardness of the CS particles each including 60.0 wt % to 82.0 wt % of the core layer used in each of Example 3-7 to Example 3-10 was from 85 to 90.

Example 4

[Manufacture of Thermoplastic Polyurethane Resin Composition (Resin Raw Material)]

An adipate-based TPU having a flow starting point of 180° C. was used as a TPU. Trixylenyl phosphate was used as a phosphoric acid ester-based flame retardant. 5 Kinds of core-shell rubber particles including core layers each composed of an acrylic rubber and shell layers composed of acrylic copolymers having different degrees of crosslinking were used as CS particles. That is, particles each of which is composed of one core layer and one shell layer were used as the CS particles. The used core-shell rubber particles each included 89.0 wt % of the core layer.

The degree of crosslinking of the shell layer of each of the CS particles was regulated by a ratio among methyl methacrylate, butyl acrylate, and allyl methacrylate used in the formation of the shell layer in the manufacturing method for the CS particles in Example 1 described above. Then, 11 kinds of thermoplastic polyurethane resin compositions (resin raw materials) were manufactured in the same manner as in Example 1 described above.

[Manufacture of Conductor Covering Material]

11 Kinds of conductor covering materials were manufactured in the same manner as in Example 1 described above.

[Flame Retardancy Test]

The conductor covering materials (test pieces of the thermoplastic polyurethane resin compositions) were each subjected to a flame retardancy test in the same manner as in Example 1 described above.

[Result]

As in FIG. 5A described above, the formulation of each of the thermoplastic polyurethane resin composition and the conductor covering material, and results of the flame retardancy tests, of each of Example 4-1 to Example 4-11 are shown in FIG. 8. In the column "FORMULATION" of FIG. 8, a number attached to the right side of the symbol "CS-SC" represents the degree of crosslinking (%) of the shell layer of each of CS particles. That is, for example, the symbol "CS-SC0.50" represents CS particles each including a shell layer having a degree of crosslinking of 0.50%. The results of Example 3-5 described above in which CS particles (CS-SC0.00) each including a shell layer that was not crosslinked (i.e., a shell layer having a degree of crosslinking of 0%) were used are shown as Example 4-1 in FIG. 8.

In each of Example 4-1 to Example 4-11, the test piece did not burn out. That is, in each of Example 4-1 to Example 4-11, the thermoplastic polyurethane resin composition and the conductor covering material each exhibited high flame retardancy. In addition, the results of the flame retardancy tests of Example 4-2 in which the CS particles each including a shell layer having a degree of crosslinking of 0.25% were used were on a par with those of Example 4-1 in which the CS particles each including the shell layer that was not crosslinked were used. However, in each of Example 4-7 to Example 4-11 in which the CS particles each including a shell layer having a degree of crosslinking of from 0.45% to 2.00% were used, the flame-out time in the first test was much shorter than those of Example 4-1 to Example 4-6, and was from 0 seconds to 11 seconds.

That is, when a thermoplastic polyurethane resin composition and a conductor covering material each contained such CS particles each including a shell layer having a degree of crosslinking of 0.45% or more (more specifically, 0.45% or more and 2.00% or less) as those in each of Example 4-7 to Example 4-11, the first flame-out time was ranked as "A" and the second flame-out time was ranked as "C", and hence the thermoplastic polyurethane resin composition and the conductor covering material each exhibited extremely excellent flame retardancy.

Example 5

[Manufacture of Thermoplastic Polyurethane Resin Composition (Resin Raw Material)]

An adipate-based TPU having a flow starting point of 180° C. was used as a TPU. Trixylenyl phosphate was used as a phosphoric acid ester-based flame retardant. 11 Kinds of core-shell rubber particles including a core layer composed of a butadiene rubber or a styrene-butadiene rubber and a shell layer composed of an acrylic copolymer that was not crosslinked at different weight ratios, and commercial core-shell rubber particles (each containing 70 wt % of a polydimethylsiloxane rubber) (Metablen SX005, manufactured by Mitsubishi Rayon Co., Ltd.) each including a core layer composed of a silicone rubber (polydimethylsiloxane-polyn-butyl acrylate composite rubber) and a shell layer composed of an acrylic copolymer that was not crosslinked (poly(methyl methacrylate)), i.e., a total of 12 kinds of core-shell rubber particles (each having a volume-average particle diameter of primary particles of from 181 nm to 191 nm) were used as CS particles. That is, particles each of which is composed of one core layer and one shell layer were used as the core-shell rubber particles.

Butadiene rubber particles composing the core layer were manufactured as described below. That is, 200 parts by weight of deionized water, 0.002 part by weight of ethylenediamine tetraacetic acid disodium salt, 0.0012 part by weight of ferrous sulfate, 0.008 part by weight of ethylenediamine tetraacetic acid disodium salt, and a sodium polyoxyethylene alkyl ether phosphate in such an amount that a target value for a number-average particle diameter was obtained were loaded into a pressure-resistant vessel having a temperature gauge, a stirring machine, a nitrogen inlet, and an apparatus for adding a monomer and an emulsifying agent, followed by deoxidation and nitrogen replacement. After that, 100 parts by weight of butadiene, 0.05 part by weight of sodium formaldehyde sulfoxylate, and 0.2 part by weight of paramenthane hydroperoxide were added to the vessel, and then 1.4 parts by weight of a sodium polyoxyethylene alkyl ether phosphate was dropped to the vessel over 6 hours. After that, the mixture was held until a conversion ratio exceeded 97 wt %, followed by the addition of 0.1 part by weight of sodium formaldehyde sulfoxylate. Thus, a rubber latex of butadiene rubber particles each having a glass transition temperature of $-80°$ C. was obtained.

Styrene-butadiene rubber particles constituting the core layer were manufactured as described below. That is, 200 parts by weight of deionized water, 0.002 part by weight of ethylenediamine tetraacetic acid disodium salt, 0.0012 part by weight of ferrous sulfate, 0.008 part by weight of ethylenediamine tetraacetic acid disodium salt, and a sodium polyoxyethylene alkyl ether phosphate in such an amount that a target value for a number-average particle diameter was obtained were loaded into a pressure-resistant vessel having a temperature gauge, a stirring machine, a nitrogen inlet, and an apparatus for adding a monomer and an emulsifying agent, followed by deoxidation and nitrogen replacement. After that, 75 parts by weight of butadiene, 25 parts by weight of styrene, 0.05 part by weight of sodium formaldehyde sulfoxylate, and 0.2 part by weight of paramenthane hydroperoxide were added to the vessel, and then 1.4 parts by weight of a sodium polyoxyethylene alkyl ether phosphate was dropped to the vessel over 6 hours. After that, the mixture was held until a conversion ratio exceeded 97 wt %. Thus, a rubber latex of styrene-butadiene rubber particles each having a glass transition temperature of $-53.5°$ C. was obtained.

In this example, as described above, commercial particles were used as CS particles each having a core layer composed of a silicone rubber particle, but the silicone rubber particles composing the core layers are manufactured, for example, as described below. That is, a mixed liquid formed of deionized water, sodium dodecylbenzenesulfonate, dodecylbenzenesulfonic acid, 85 parts by weight of a terminal hydroxyorganopolysiloxane (manufactured by Dow Corning Toray Silicone Co., Ltd., trade name: PRX413), and 2.55 parts by weight of γ-methacryloyloxypropylmethyldimethoxysilane is subjected to mechanical shearing with T.K. ROBOMIX at such a number of revolutions that a target number-average particle diameter is obtained for 10 minutes to prepare an emulsion.

The resultant emulsion is added to a vessel made of glass having a temperature gauge, a stirring machine, a nitrogen inlet, and an apparatus for adding a monomer and an emulsifying agent together with 200 parts by weight of deionized water, and the mixture is subjected to a reaction at 25° C. for 24 hours while being stirred. After that, the pH of the system is regulated to 6.8 with sodium hydroxide. Next, 0.006 part by weight of ethylenediamine tetraacetic acid disodium salt, 0.001 part by weight of ferrous sulfate heptahydrate, and 0.2 part by weight of sodium formaldehyde sulfoxylate are added to the vessel. After that, 2 parts by weight of triallyl isocyanurate and 0.01 part by weight of cumene hydroperoxide are added to the vessel, and the contents are polymerized for 3 hours to provide a rubber latex of silicone rubber particles each having a glass transition temperature of $-110°$ C.

Then, a latex of core-shell rubber particles was manufactured in the same manner as in Example 1 described above by forming the shell layer through the use of the rubber particles composing the core layers. That is, the acrylic copolymer that was not crosslinked composing the shell layer of each of the CS particles each including the core layer composed of the butadiene rubber was formed as a copolymer having a glass transition temperature of 91.6° C. by the copolymerization of methyl methacrylate and butyl acrylate in the same manner as in Example 1 described above except that allyl methacrylate was not used. In addition, the acrylic copolymer that was not crosslinked composing the shell layer of each of the CS particles each including the core layer composed of the styrene-butadiene rubber was formed as a copolymer having a glass transition temperature of 104.7° C. by the copolymerization of methyl methacrylate and styrene in the same manner as in Example 1 described above except that: allyl methacrylate was not used; and styrene was used instead of butyl acrylate. The acrylic copolymer that is not crosslinked composing the shell layer of each of the CS particles each including the core layer composed of the silicone rubber can also be similarly formed by the copolymerization of methyl methacrylate and butyl acrylate, or by the copolymerization of methyl methacrylate and styrene. Next, a core-shell rubber particle powder was obtained in the same manner as in Example 1 described above. Further, 12 kinds of resin raw materials were manufactured in the same manner as in Example 1 described above.

[Manufacture of Conductor Covering Material]

12 Kinds of conductor covering materials were manufactured in the same manner as in Example 1 described above.

[Flame Retardancy Test]

The conductor covering materials (test pieces of the thermoplastic polyurethane resin compositions) were each subjected to a flame retardancy test in the same manner as in Example 1 described above.

[Result]

As in FIG. 5A described above, the formulation of each of the thermoplastic polyurethane resin composition and the conductor covering material, and results of the flame retardancy tests, of each of Example 5-1 to Example 5-12 are shown in FIG. 9. In the column "FORMULATION" of FIG. 9, the symbol "CS-BR" represents CS particles each including a core layer of a butadiene rubber, the symbol "CS-SBR" represents CS particles each including a core layer of a styrene-butadiene rubber, and the symbol "CS-SiR" represents CS particles each including a core layer of a silicone rubber. In addition, a number attached to the right side of each of the symbols "CS-BR", "CS-SBR", and "CS-SiR" represents the wt % of the core layer of each of CS particles.

That is, for example, the symbol "CS-SBR70" represents CS particles each including 70 wt % of a core layer of a styrene-butadiene rubber.

As shown in FIG. 9, in each of Example 5-1 to Example 5-5 in which the CS particles each including 63.0 wt % to 78.0 wt % of the core layer of the butadiene rubber were used, Example 5-6 to Example 5-11 in which the CS particles each including 45 wt % to 75 wt % of the core layer of the styrene-butadiene rubber were used, and Example 5-12 in which the CS particles each including 70 wt % of the core layer of the silicone rubber were used, the test piece did not burn out.

In particular, in a case where the CS particles each including the core layer of the styrene-butadiene rubber were used, the first flame-out time was as short as from 0 seconds to 3 seconds. However, as can be seen from the results of Example 3 and Example 4 described above, in a case where CS particles each including a core layer of an acrylic rubber were used, flame retardancy higher than that in a case where the CS particles each including the core layer of the styrene-butadiene rubber were used was shown.

Example 6

[Manufacture of Thermoplastic Polyurethane Resin Composition (Resin Raw Material)]

An adipate-based TPU having a flow starting point of 180° C. was used as a TPU. Trixylenyl phosphate was used as a phosphoric acid ester-based flame retardant. CS particles were not used and resin particles each having no core-shell structure were used instead. That is, commercial polymethyl methacrylate (PMMA) particles, acrylonitrile-butadiene rubber (NBR) particles, ethylene-vinyl acetate copolymer (EVA) particles, or ethylene-ethyl acrylate copolymer (EEA) particles were used. Then, 4 kinds of thermoplastic polyurethane resin compositions (resin raw materials) were manufactured in the same manner as in Example 1 described above.

[Manufacture of Conductor Covering Material]

4 Kinds of conductor covering materials were manufactured in the same manner as in Example 1 described above.

[Flame Retardancy Test]

The conductor covering materials (test pieces of the thermoplastic polyurethane resin compositions) were each subjected to a flame retardancy test in the same manner as in Example 1 described above.

[Result]

As in FIG. 5A described above, the formulation of each of the thermoplastic polyurethane resin composition and the conductor covering material, and results of the flame retardancy tests, of each of Example 6-1 to Example 6-4 are shown in FIG. 10. In each of Example 6-1 to Example 6-4, the dripping of the test piece occurred in the first test. That is, when a thermoplastic polyurethane resin composition and a conductor covering material each contained resin particles each having no core-shell structure, and were each free of CS particles like Example 6-1 to Example 6-4, the flame retardancy of each of the thermoplastic polyurethane resin composition and the conductor covering material was extremely low.

Example 7

[Manufacture of Thermoplastic Polyurethane Resin Composition (Resin Raw Material)]

An adipate-based TPU having a flow starting point of 180° C. was used as a TPU. 7 Kinds of commercial phosphoric acid esters having different chemical structures were used as phosphoric acid ester-based flame retardants. Core-shell rubber particles each including 89 wt % of a core layer composed of an acrylic rubber and 11 wt % of a shell layer composed of an acrylic copolymer having a degree of crosslinking of 0.50% were used as CS particles. That is, particles each of which is composed of one core layer and one shell layer were used as the CS particles. Then, 7 kinds of thermoplastic polyurethane resin compositions (resin raw materials) were manufactured in the same manner as in Example 1 described above.

[Manufacture of Conductor Covering Material]

7 Kinds of conductor covering materials were manufactured in the same manner as in Example 1 described above.

[Flame Retardancy Test]

The conductor covering materials (test pieces of the thermoplastic polyurethane resin compositions) were each subjected to a flame retardancy test in the same manner as in Example 1 described above.

[Result]

As in FIG. 5A described above, the formulation of each of the thermoplastic polyurethane resin composition and the conductor covering material, and results of the flame retardancy tests, of each of Example 7-1 to Example 7-7 are shown in FIG. 11. The results of Example 1-9 described above in which trixylenyl phosphate was used as a phosphoric acid ester-based flame retardant are shown as Example 7-1 in FIG. 11. In FIG. 11, the symbol "PE-I" represents trixylenyl phosphate, the symbol "PE-II" represents tricresyl phosphate, the symbol "PE-III" represents triphenyl phosphate, the symbol "PE-IV" represents (1,3-phenylenedioxy)bis(phosphonic acid diphenyl), the symbol "PE-V" represents cresyl di-2,6-xylenyl phosphate, the symbol "PE-VI" represents a condensed phosphoric acid ester containing a heterocycle containing a phosphorus atom and an oxygen atom, the symbol "PE-VII" represents triethyl phosphate, and the symbol "PE-IX" represents an aromatic condensed phosphoric acid ester containing four xylenyl groups in a molecule thereof.

As shown in FIG. 11, in each of Example 7-1 to Example 7-7, a conductor covering material exhibiting excellent flame retardancy was obtained. That is, it was confirmed that each of the phosphoric acid esters used in Example 7-1 to Example 7-7 was able to be used as a phosphoric acid ester-based flame retardant. In addition, in particular, in each of Example 7-1, Example 7-2, Example 7-4, Example 7-6, and Example 7-7, the first flame-out time was ranked as "A" and the second flame-out time was ranked as "A", "B", or "C", and hence the thermoplastic polyurethane resin composition and the conductor covering material each exhibited extremely excellent flame retardancy.

Example 8

[Manufacture of Thermoplastic Polyurethane Resin Composition (Resin Raw Material)]

5 Kinds of TPU's were used as TPU's. Trixylenyl phosphate was used as a phosphoric acid ester-based flame retardant. Core-shell rubber particles each including 89 wt % of a core layer composed of an acrylic rubber and 11 wt % of a shell layer composed of an acrylic copolymer having a degree of crosslinking of 0.50% were used as CS particles. That is, particles each of which is composed of one core layer and one shell layer were used as the CS particles. Then, 7 kinds of thermoplastic polyurethane resin compositions (resin raw materials) different from one another in formulation were manufactured in the same manner as in Example 1 described above.

[Manufacture of Conductor Covering Material]

7 Kinds of conductor covering materials were manufactured in the same manner as in Example 1 described above.

[Flame Retardancy Test]

The conductor covering materials (test pieces of the thermoplastic polyurethane resin compositions) were each subjected to a flame retardancy test in the same manner as in Example 1 described above.

[Result]

As in FIG. 5A described above, the formulation of each of the thermoplastic polyurethane resin composition and the conductor covering material, and results of the flame retardancy tests, of each of Example 8-1 to Example 8-7 are shown in FIG. 12. The results of Example 1-9 described above in which the adipate-based TPU having a flow starting point of 180° C. was used as a TPU are shown as Example 8-1 in FIG. 12.

In FIG. 12, the symbol "TPU-I" represents a polyester-based (adipate-based) TPU having a flow starting point of 180° C., the symbol "TPU-II" represents a polyester-based (adipate-based) TPU having a flow starting point of 160° C., the symbol "TPU-III" represents a polyester-based (caprolactone-based) TPU having a flow starting point of 190° C., the symbol "TPU-IV" represents a polycarbonate-based TPU having a flow starting point of 184° C., and the symbol "TPU-V" represents a polyether-based TPU having a flow starting point of 190° C.

As shown in FIG. 12, in each of Example 8-1 to Example 8-7, a conductor covering material (test piece of a thermoplastic polyurethane resin composition) exhibiting excellent flame retardancy was obtained. In particular, in each of Example 8-1, Example 8-3, Example 8-5, and Example 8-7, the first flame-out time was ranked as "A" and the second flame-out time was ranked as "A", "B", or "C", and hence the thermoplastic polyurethane resin composition and the conductor covering material each exhibited extremely excellent flame retardancy. In Example 8-1 in which the polyester-based (adipate-based) TPU having a flow starting point of 180° C. was used, flame retardancy higher than that in Example 8-2 in which the polyester-based (adipate-based) TPU having a flow starting point of 160° C. was used was obtained. In addition, in Example 8-1 in which the polyester-based (adipate-based) TPU having a flow starting point of 180° C. was used, flame retardancy higher than that in Example 8-6 in which the polyether-based TPU having a flow starting point of 190° C. was used was obtained.

Example 9

[Manufacture of Thermoplastic Polyurethane Resin Composition (Resin Raw Material)]

An adipate-based TPU having a flow starting point of 180° C. was used as a TPU. Trixylenyl phosphate was used as a phosphoric acid ester-based flame retardant. CS particles (having a volume-average particle diameter of primary particles of from 181 nm to 188 nm) each including one core layer composed of an acrylic rubber and one shell layer composed of an acrylic copolymer were used as CS particles.

Various kinds of particles different from each other in content (wt %) of the core layer and/or degree of crosslinking (%) of the shell layer were synthesized and used as the CS particles. The degree of crosslinking of the shell layer of each of the CS particles was regulated by a ratio among methyl methacrylate, butyl acrylate, and allyl methacrylate used in the formation of the shell layer in the manufacturing method for the CS particles in Example 1 described above. When the degree of crosslinking of the shell layer was 0 (zero) (%), the acrylic copolymer that was not crosslinked constituting the shell layer of each of the CS particles was formed by the copolymerization of methyl methacrylate and butyl acrylate in the same manner as in Example 1 described above except that allyl methacrylate was not used.

Then, a thermoplastic polyurethane resin composition (resin raw material) containing 100 parts by weight of a resin component formed of 65 parts by weight of the TPU and 35 parts by weight of the CS particles, and 45 parts by weight of the PE flame retardant was manufactured in the same manner as in Example 1 described above.

[Manufacture of Conductor Covering Material]

Conductor covering materials were manufactured in the same manner as in Example 1 described above.

[Flame Retardancy Test]

The conductor covering materials (test pieces of the thermoplastic polyurethane resin compositions) were each subjected to a flame retardancy test in the same manner as in Example 1 described above.

[Measurement of Shore A Hardness of CS Particles]

In addition, the Shore A hardness of each of the used CS particles was measured in the same manner as in Example 2 described above.

[Result]

The results of the flame retardancy tests of the thermoplastic polyurethane resin composition and the conductor covering material, and the result of the measurement of the Shore A hardness of the CS particles are shown in FIG. 13 for each of various examples different from each other in content (wt %) of the core layer of each of the used CS particles and/or degree of crosslinking (%) of the shell layer thereof.

In FIG. 13, a flame-out time and a rank in a flame retardancy test are shown in the upper stage of each column, and the Shore A hardness of the CS particles is shown in the lower stage thereof. That is, for example, when CS particles each including 89.0 wt % of a core layer and 11.0 wt % of a shell layer having a degree of crosslinking of 0.50% were used, in a column corresponding to a content of the core layer of "89.0 wt %" and a degree of crosslinking of the shell layer of "0.50%", the fact that the first flame-out test in the flame retardancy test was 0 seconds and ranked as "A", and the second flame-out time in the test was 57 seconds and ranked as "C" is represented as "A(0)/C(57)" in the upper stage, and the fact that the Shore A hardness of the CS particles was 67 is represented as "<67>" in the lower stage.

When the shell layer of each of the CS particles was not crosslinked (its degree of crosslinking was 0 (zero) %), as shown in Example 3 described above, in the range of the content of the core layer of each of the CS particles of from 60.0 wt % or more to 82.0 wt % or less, the Shore A hardness of the CS particles was 85 or more and 90 or less, and in the flame retardancy tests, the first flame-out time was ranked as "A" and the second flame-out time was ranked as "C", and hence the thermoplastic polyurethane resin composition and the conductor covering material each exhibited extremely excellent flame retardancy.

In addition, in each of the cases where the degree of crosslinking of the shell layer of each of the CS particles was 0.25%, 0.35%, and 0.42%, when the core layer content of each of the CS particles was 85.0 wt %, in the flame retardancy tests, the first flame-out time was ranked as "A" and the second flame-out time was ranked as "B", and hence the thermoplastic polyurethane resin composition and the conductor covering material each exhibited extremely excellent flame retardancy.

In addition, in each of the cases where the degree of crosslinking of the shell layer of each of the CS particles was 0.45%, when the core layer content of each of the CS particles was 89.0 wt %, in the flame retardancy tests, the first flame-out time was ranked as "A" and the second flame-out time was ranked as "C", and hence the thermoplastic polyurethane resin composition and the conductor covering material each exhibited extremely excellent flame retardancy.

In addition, in each of the cases where the degree of crosslinking of the shell layer of each of the CS particles was 0.50% and 2.00%, when the core layer content of each of the CS particles was 89.5 wt %, in the flame retardancy tests, the first flame-out time was ranked as "A" and the second flame-out time was ranked as "C", and hence the thermoplastic polyurethane resin composition and the conductor covering material each exhibited extremely excellent flame retardancy.

In addition, in each of the cases where the degree of crosslinking of the shell layer of each of the CS particles was 0.50%, when the core layer content of each of the CS particles was 52.0 wt %, in the flame retardancy tests, the first flame-out time was ranked as "A" and the second flame-out time was ranked as "B", and hence the thermoplastic polyurethane resin composition and the conductor covering material each exhibited extremely excellent flame retardancy.

In addition, in each of the cases where the degree of crosslinking of the shell layer of each of the CS particles was 2.00%, when the core layer content of each of the CS particles was 50.0 wt %, in the flame retardancy tests, the first flame-out time was ranked as "A" and the second flame-out time was ranked as "C", and hence the thermoplastic polyurethane resin composition and the conductor covering material each exhibited extremely excellent flame retardancy.

Example 10

[Manufacture of Thermoplastic Polyurethane Resin Composition (Resin Raw Material)]
An adipate-based TPU having a flow starting point of 180° C. was used as a TPU. Trixylenyl phosphate was used as a phosphoric acid ester-based flame retardant. CS particles each including 75.0 wt % of one core layer composed of an acrylic rubber and one shell layer composed of an acrylic copolymer that was not crosslinked were used as CS particles.

In addition, as in Example 1 described above, the TPU, the PE flame retardant, and the CS particles were mixed with a mixing roll (temperature: from 170° C. to 180° C.) at 10 different kinds of blending ratios to manufacture, as mixtures thereof, 10 kinds of thermoplastic polyurethane resin compositions (resin raw materials) different from one another in composition.

[Manufacture of Conductor Covering Material]
10 Kinds of conductor covering materials were manufactured in the same manner as in Example 1 described above.

[Flame Retardancy Test]
The conductor covering materials (test pieces of the thermoplastic polyurethane resin compositions) were each subjected to a flame retardancy test in the same manner as in Example 1 described above.

[Result]
As in FIG. 5A described above, the formulation of the conductor covering material, and results of the flame retardancy tests, of each of Example 10-1 to Example 10-10 are shown in FIG. 14.

As shown in FIG. 14, in each of Example 10-4 to Example 10-6 in which the thermoplastic polyurethane resin composition and the conductor covering material each contained 100 parts by weight of the resin component formed of 60.0 parts by weight or more and 70.0 parts by weight or less of the TPU, and 30.0 parts by weight or more and 40.0 parts by weight or less of the CS particles, and 45 parts by weight of the PE flame retardant, in the flame retardancy tests, the first flame-out time was ranked as "A" and the second flame-out time was ranked as "C", and hence the thermoplastic polyurethane resin composition and the conductor covering material each exhibited extremely excellent flame retardancy.

Example 11

[Manufacture of Thermoplastic Polyurethane Resin Composition (Resin Raw Material)]
An adipate-based TPU having a flow starting point of 180° C. was used as a TPU. Trixylenyl phosphate was used as a phosphoric acid ester-based flame retardant. CS particles each including 75.0 wt % of one core layer composed of an acrylic rubber and 25.0 wt % of one shell layer composed of an acrylic copolymer that was not crosslinked were used as CS particles.

In addition, as in Example 2 described above, the TPU, the PE flame retardant, and the CS particles were mixed with a mixing roll (temperature: from 170° C. to 180° C.) at 7 different kinds of blending ratios while the blending amount of the PE flame retardant was changed to manufacture, as mixtures thereof, 7 kinds of thermoplastic polyurethane resin compositions (resin raw materials) different from one another in composition.

[Manufacture of Conductor Covering Material]
7 Kinds of conductor covering materials were manufactured in the same manner as in Example 1 described above.

[Flame Retardancy Test]
The conductor covering materials (test pieces of the thermoplastic polyurethane resin compositions) were each subjected to a flame retardancy test in the same manner as in Example 1 described above.

[Result]
As in FIG. 5A described above, the formulation of the conductor covering material, and results of the flame retardancy tests, of each of Example 11-1 to Example 11-7 are shown in FIG. 15.

As shown in FIG. 15, in each of Example 11-3 to Example 11-7 in which the thermoplastic polyurethane resin composition and the conductor covering material each contained 41 parts by weight or more and 85 parts by weight or less of the PE flame retardant with respect to 100 parts by weight of the resin component formed of the TPU and the CS particles, in the flame retardancy tests, the first flame-out time was ranked as "A" and the second flame-out time was ranked as "A" or "C", and hence the thermoplastic polyurethane resin composition and the conductor covering material each exhibited extremely excellent flame retardancy.

The invention claimed is:
1. A thermoplastic polyurethane resin composition, comprising:
   100 parts by weight of a resin component formed of 58.1 parts by weight or more and 73.9 parts by weight or less of a thermoplastic polyurethane resin and 26.1 parts by weight or more and 41.9 parts by weight or less of core-shell polymer particles; and 42 parts by weight or more and 87 parts by weight or less of a phosphoric acid ester-based flame retardant, wherein:

the core-shell polymer particles each include one or more core layers and one or more shell layers;

the core layers include an outermost core layer composed of a polymer having a glass transition temperature of less than 40° C.;

the shell layers include a crosslinked shell layer composed of a copolymer obtained by polymerization of raw materials including one or more kinds selected from a group consisting of a (meth)acrylic acid ester and a vinyl cyanide compound, and a polyfunctional monomer, the copolymer having a glass transition temperature of 40° C. or more; and the core-shell polymer particles are one or more kinds selected from a group consisting of the following (a) to (d):

(a) core-shell polymer particles each including 50.1 wt % or more and 88.9 wt % or less of the core layers with respect to 100 wt % of a total of the core layers and the shell layers, and having a degree of crosslinking of the crosslinked shell layer of 0.05% or more and 0.42% or less;

(b) core-shell polymer particles each including 50.1 wt % or more and 89.4 wt % or less of the core layers with respect to 100 wt % of a total of the core layers and the shell layers, and having a degree of crosslinking of the crosslinked shell layer of more than 0.42% and 0.45% or less;

(c) core-shell polymer particles each including 50.1 wt % or more and 90.4 wt % or less of the core layers with respect to 100 wt % of a total of the core layers and the shell layers, and having a degree of crosslinking of the crosslinked shell layer of more than 0.45% and 0.50% or less; and (d) core-shell polymer particles each including 40.1 wt % or more and 90.4 wt % or less of the core layers with respect to 100 wt % of a total of the core layers and the shell layers, and having a degree of crosslinking of the crosslinked shell layer of more than 0.50% and 5.00% or less.

2. The thermoplastic polyurethane resin composition according to claim 1, wherein the copolymer composing the crosslinked shell layer is a copolymer of one or more kinds selected from a group consisting of the (meth)acrylic acid ester and the vinyl cyanide compound, the polyfunctional monomer, and an unsaturated monomer capable of copolymerizing therewith.

3. The thermoplastic polyurethane resin composition according to claim 1, wherein the thermoplastic polyurethane resin composition comprises:

100 parts by weight of the resin component formed of 59.1 parts by weight or more and 73.9 parts by weight or less of the thermoplastic polyurethane resin and 26.1 parts by weight or more and 40.9 parts by weight or less of the core-shell polymer particles; and 42 parts by weight or more and 87 parts by weight or less of the phosphoric acid ester-based flame retardant.

4. The thermoplastic polyurethane resin composition according to claim 1, wherein each of the core-shell polymer particles includes 57.1 wt % or more and 82.0 wt % or less of the core layers with respect to 100 wt % of a total of the core layers and the shell layers.

5. A thermoplastic polyurethane resin composition, comprising:

100 parts by weight of a resin component formed of 58.1 parts by weight or more and 73.9 parts by weight or less of a thermoplastic polyurethane resin and 26.1 parts by weight or more and 41.9 parts by weight or less of core-shell polymer particles; and 42 parts by weight or more and 87 parts by weight or less of a phosphoric acid ester-based flame retardant, wherein each of the core-shell polymer particles is composed of one or more core layers and one or more shell layers, and each includes 57.1 wt % or more and 82.0 wt % or less of the core layers with respect to 100 wt % of a total of the core layers and the shell layers, and wherein the core-shell polymer particles have a Shore A hardness of 81 or more and 100 or less, the hardness being measured by a method in conformity with JIS K 6253-3:2012 in which: a type A durometer is used as a testing machine; an automatic timer apparatus is not used; a laminate obtained by laminating 6 sheets (30 mm×40 mm) each having a thickness of 1.0 mm or more and 1.5 mm or less is used as a test piece; the test piece is subjected to conditioning at a temperature of 23° C. and a relative humidity of 50% for 24 hours or more, and then a pressure plate is brought into contact with the test piece at a temperature of 23° C. and a relative humidity of 50%; and a measured value 10 seconds after the contact is read.

6. A thermoplastic polyurethane resin composition, comprising:

100 parts by weight of a resin component formed of 58.1 parts by weight or more and 73.9 parts by weight or less of a thermoplastic polyurethane resin and 26.1 parts by weight or more and 41.9 parts by weight or less of core-shell polymer particles; and 42 parts by weight or more and 87 parts by weight or less of a phosphoric acid ester-based flame retardant, wherein each of the core-shell polymer particles is composed of one or more core layers and one or more shell layers, and each includes 57.1 wt % or more and 82.0 wt % or less of the core layers with respect to 100 wt % of a total of the core layers and the shell layers, and wherein each of the one or more shell layers is composed of a polymer obtained by polymerization of a raw material including one or more kinds selected from a group consisting of a (meth)acrylic acid ester and a vinyl cyanide compound, the raw material is free of a polyfunctional monomer, the polymer having a glass transition temperature of 40° C. or more.

7. The thermoplastic polyurethane resin composition according to claim 6, wherein the thermoplastic polyurethane resin composition comprises:

100 parts by weight of the resin component formed of 58.6 parts by weight or more and 73.4 parts by weight or less of the thermoplastic polyurethane resin and 26.6 parts by weight or more and 41.4 parts by weight or less of the core-shell polymer particles.

8. The thermoplastic polyurethane resin composition according to claim 6, wherein the polymer composing each of the one or more shell layers is a copolymer of one or more kinds selected from a group consisting of the (meth)acrylic acid ester and the vinyl cyanide compound, and an unsaturated monomer capable of copolymerizing therewith.

* * * * *